(12) United States Patent
Yang et al.

(10) Patent No.: US 12,189,536 B2
(45) Date of Patent: Jan. 7, 2025

(54) MEMORY CONTROLLER WITH IMPROVED MAPPING INFORMATION MANAGEMENT, MEMORY SYSTEM INCLUDING THE SAME, AND OPERATING METHOD OF MEMORY CONTROLLER

(71) Applicant: SAMSUNG ELECTRONICS CO., LTD., Suwon-si (KR)

(72) Inventors: Kyungbo Yang, Suwon-si (KR); Hyeonwu Kim, Suwon-si (KR); Dongik Jeon, Suwon-si (KR); Soonsuk Hwang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/135,894

(22) Filed: Apr. 18, 2023

(65) Prior Publication Data
US 2024/0119009 A1    Apr. 11, 2024

(30) Foreign Application Priority Data
Oct. 6, 2022   (KR) .................. 10-2022-0128086

(51) Int. Cl.
*G06F 12/00* (2006.01)
*G06F 12/02* (2006.01)
*G06F 12/10* (2016.01)

(52) U.S. Cl.
CPC .......... *G06F 12/10* (2013.01); *G06F 12/0246* (2013.01); *G06F 2212/7201* (2013.01); *G06F 2212/7203* (2013.01)

(58) Field of Classification Search
CPC ................ G06F 12/10; G06F 12/0246; G06F 2212/7201; G06F 2212/7203
See application file for complete search history.

(56) References Cited

U.S. PATENT DOCUMENTS

| | | | |
|---|---|---|---|
| 8,495,280 | B2 | 7/2013 | Kang et al. |
| 8,700,881 | B2 | 4/2014 | Lee |
| 10,157,004 | B2 | 12/2018 | Michaeli |
| 11,379,356 | B2 | 7/2022 | Lee |
| 2008/0215800 | A1 | 9/2008 | Lee et al. |
| 2009/0055578 | A1 | 2/2009 | Lee et al. |

(Continued)

FOREIGN PATENT DOCUMENTS

KR    10-1516580 B1    5/2015

OTHER PUBLICATIONS

Extended European Search Report dated Feb. 26, 2024 in European Application No. 23181976.4.

*Primary Examiner* — John A Lane
(74) *Attorney, Agent, or Firm* — Sughrue Mion, PLLC

(57) ABSTRACT

A memory controller receives a write request and write data from a host, stores first entry information including a write buffer pointer indicating a location where the write data is temporarily stored in a write buffer and a first logical address corresponding to the write request in an entry buffer, stores an entry index generated based on the first entry information in a first storage space corresponding to the first logical address in a logical-to-physical (L2P) mapping information storage circuit, and updates the entry index stored in the first storage space to a physical address newly mapped to the first logical address as the write data is programmed in a memory device.

20 Claims, 22 Drawing Sheets

(56) References Cited

U.S. PATENT DOCUMENTS

| | | |
|---|---|---|
| 2013/0124794 A1 | 5/2013 | Bux et al. |
| 2015/0006591 A1* | 1/2015 | Lee et al. |
| 2016/0342509 A1* | 11/2016 | Kotte .................. G06F 12/0246 |
| 2020/0065241 A1* | 2/2020 | Cho .................... G06F 12/0246 |
| 2021/0064520 A1 | 3/2021 | Kanno |
| 2021/0181966 A1* | 6/2021 | Xu ......................... G06F 3/061 |
| 2022/0083258 A1* | 3/2022 | You ....................... G06F 3/0679 |
| 2022/0156181 A1 | 5/2022 | Cariello |

* cited by examiner

FIG. 11

L2P Map Table

| LPN | PPN/Entry Index |
|---|---|
| 0 | PPN |
| 1 | Entry Pattern \| Entry Index |
| ⋮ | ⋮ |
| N | PPN |

MEMORY CONTROLLER WITH IMPROVED MAPPING INFORMATION MANAGEMENT, MEMORY SYSTEM INCLUDING THE SAME, AND OPERATING METHOD OF MEMORY CONTROLLER

CROSS-REFERENCE TO RELATED APPLICATION

This application is based on and claims priority under 35 U. S. C. § 119 to Korean Patent Application No. 10-2022-0128086, filed on Oct. 6, 2022, in the Korean Intellectual Property Office, the disclosure of which is incorporated by reference herein in its entirety.

BACKGROUND

This application relates to a memory controller, and more particularly, to a memory controller with improved mapping information management, a memory system including the same, and a method of operating the memory controller.

As a nonvolatile memory, flash memory may retain stored data even when power thereto is cut off. As a memory system including flash memory, memory systems (or storage devices), such as a Solid State Drive (SSD) and memory cards, are widely used, and memory systems are useful for storing or moving large amounts of data.

The memory system may generally include a data buffer (or write buffer) for receiving write data and temporarily storing the received write data. In addition, the data writing operation of the memory system may have a lower speed than the reading operation, and information for determining the position of the write data temporarily stored in the data buffer needs to be managed during the data writing process. However, as the capacity of the memory system increases and processing performance for management of memory operations (e.g., NAND operations such as writing and/or reading data) needs to be maximized, additional management of information in the data recording process has a problem of latency being high causing quality of service (QOS) being low.

SUMMARY

Embodiments provide a memory controller capable of efficiently managing information during memory operation to reduce resources required for information management and ensuring coherency of data stored in a write buffer, a memory system including the same, and a method of operating the memory controller.

Provided herein is a method of operating a memory controller for controlling a memory device, the method including: receiving a write request and write data from a host; storing first entry information in an entry buffer, wherein the first entry information includes a write buffer pointer indicating a first location where the write data is temporarily stored in a write buffer and the first entry information includes a first logical address corresponding to the write request; storing an entry index in a logical-to-physical (L2P) mapping information storage circuit, wherein the entry index is configured to address the first entry information in a first storage space of the L2P mapping information storage circuit, and wherein the entry index depends on the first logical address in the L2P mapping information storage circuit; programming the write data into the memory device at a first physical address; and updating the entry index stored in the first storage space to correspond to the first physical address, wherein the first physical address is mapped to the first logical address.

A memory controller for controlling a memory device, the memory controller including: a host interface configured to: communicate with a host, and receive a write request, write data, and a first logical address wherein the first logical address corresponds to the write data; a processor configured to control a program operation of the memory device in response to the write request; a write buffer configured to temporarily store the write data; an entry buffer configured to store first entry information, the first entry information including a write buffer pointer, the write buffer pointer indicating a first location where the write data is stored in the write buffer; and a logical-to-physical (L2P) mapping information storage circuit including a plurality of storage spaces, wherein the L2P mapping information storage circuit is configured to store, in a first storage space, an entry index indicating a second location where the first entry information is stored in the entry buffer, wherein the first storage space corresponds to the first logical address, wherein the processor is further configured to: program the write data into the memory device at a first physical address, and update the entry index stored in the first storage space to correspond to the first physical address, wherein the first physical address is mapped to the first logical address.

A memory system configured to communicate with a host, the memory system including: a memory controller configured to: receive a write request and write data from the host, and control a memory operation in response to the write request; a volatile memory configured to store mapping information between a logical address from the host and a physical address, the physical address indicating a physical storage location of the write data; and a nonvolatile memory device including a plurality of cell blocks, each cell block including a plurality of nonvolatile memory cells, wherein the memory controller is configured to: store, in the volatile memory, first information identifying a location of the write data temporarily stored in the memory system before the write data is programmed into the nonvolatile memory device, and update, in the volatile memory, the physical address mapped to the logical address when the write data is programmed into the nonvolatile memory device.

BRIEF DESCRIPTION OF THE DRAWINGS

Embodiments will be more clearly understood from the following detailed description taken in conjunction with the accompanying drawings in which:

FIG. 11 is a diagram illustrating an information storage example of an L2P mapping information storage circuit according to an example embodiment;

DETAILED DESCRIPTION OF THE EMBODIMENTS

Hereinafter, embodiments will be described in detail with reference to the accompanying drawings.

Figure 1:
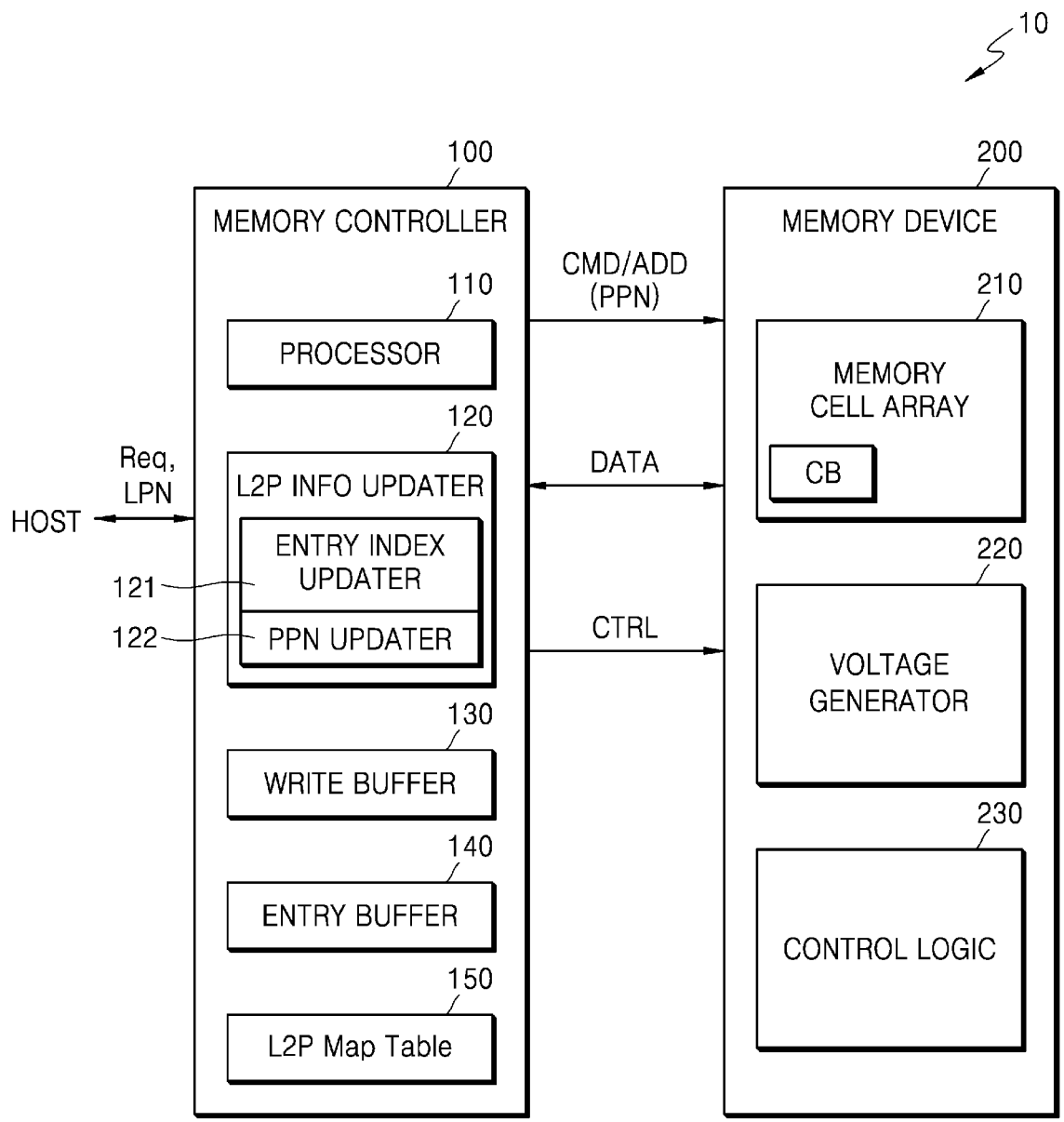
FIG. 1 is a block diagram illustrating a memory system according to an example embodiment.

FIG. 1 is a block diagram illustrating a memory system according to an example embodiment.

Referring to FIG. 1, a memory system 10 may include a memory controller 100 and a memory device 200, and the memory device 200 may include a memory cell array 210, a voltage generator 220, and a control logic 230. In addition, the control logic 230 may perform various internal control operations in relation to the memory operation, and may also control the voltage generator 220 to generate voltage signals of various levels.

The memory system 10 may communicate with the host through various interfaces, and as an example, the memory system 10 may communicate with a host using interfaces such as Universal Serial Bus (USB), multimedia card (MMC), embedded MMC (eMMC), peripheral component interconnection (PCI), PCI-express (PCI-E), Advanced Technology Attachment (ATA), Serial-ATA, Parallel-ATA, small computer small interface (SCSI), enhanced small disk interface (ESDI), Integrated Drive Electronics (IDE), Firewire, Universal Flash Storage (UFS), and Nonvolatile Memory express (NVMe).

According to an example embodiment, the memory device 200 may include a nonvolatile memory device, such as a flash memory. In some embodiments, the memory system 10 may be implemented as an embedded or removable memory in an electronic device, and for example, the memory system 10 may be implemented in various forms, such as an Embedded Universal Flash Storage (UFS) memory device, an embedded Multi-Media Card (eMMC), a Solid State Drive (SSD), a UFS memory card, a Compact Flash (CF) memory card, a Secure Digital (SD) memory card, a Micro Secure Digital (Micro-SD) memory card, a Mini Secure Digital (Mini-SD) memory card, an extreme Digital (xD) memory card, or a Memory Stick. Also, the memory system 10 may be referred to as a storage device since the memory system 10 non-volatilely stores data. Data is non-volatilely stored by programming the data into memory such that the data is retained after power to the memory is shut off.

In response to various requests Req, such as writing and reading data from the host, the memory controller 100 may control the memory device 200 to read data stored in the memory device 200 or write (or program) data to the memory device 200. As an example, the memory controller 100 includes a processor 110, and the processor 110 may control overall internal operations of the memory controller 100 and also control memory operations of the memory device 200. Specifically, the memory controller 100 may control write, read, and erase operations of the memory device 200 by providing an address ADD, a command CMD, and a control signal CTRL to the memory device 200. Also, data DATA to be stored in the memory device 200 and data DATA read from the memory device 200 may be transmitted and received between the memory controller 100 and the memory device 200. In various embodiments, information transmitted or received from the host to indicate writing or reading data may be referred to as a request or as a command.

The memory cell array 210 may include a plurality of cell blocks CB, and each of the cell blocks CB may include flash memory cells. Hereinafter, embodiments are described in detail considering a case in which the cell block CB includes NAND flash memory cells, as an example. However, in some embodiments, the plurality of memory cells may be resistive memory cells, such as resistive RAM (ReRAM), phase change RAM (PRAM), or magnetic RAM (MRAM).

In one embodiment, the memory cell array 210 may include a three-dimensional memory cell array, and the three-dimensional memory cell array may include a plurality of NAND strings, and each NAND string may include memory cells respectively connected to word lines vertically stacked on a substrate. However, in some embodiments, the memory cell array 210 may include a two-dimensional memory cell array, and the two-dimensional memory cell array may include a plurality of NAND strings arranged in row and column directions.

The control logic 230 may control the overall operation of the memory device 200, and as an example, based on the command CMD, address ADD, and control signal CTRL, received from the memory controller 100, the control logic 230 may perform various internal control operations for programming data into the memory cell array 210 or reading data from the memory cell array 210. Also, the control logic 230 may output a voltage control signal (not shown) for adjusting the levels of various voltages output from the voltage generator 220 in relation to the program operation, the read operation, and the erase operation.

Meanwhile, the memory controller 100 may include a logical to physical (L2P) information updater 120 that manages mapping information between a logical address from a host and a physical address representing a physical storage location of data. The L2P information updater may be implemented by a hardware circuit in the memory controller 100 or software executed by processor 110. In addition, the memory controller 100 may further include a write buffer 130 that temporarily stores data (e.g., write data) received along with a write request from the host, and in addition, may further include an entry buffer 140 that stores information indicating a location where data is stored in the write buffer 130. Also, the memory controller 100 may further include a logical-physical L2P mapping information storage circuit 150 in which an update operation is managed by the L2P information updater 120 and mapping information between the aforementioned logical addresses and physical addresses is stored. The L2P mapping information storage circuit 150 may be referred to as an L2P mapping table or may be defined as storing an L2P mapping table in terms of storing mapping information between logical addresses and physical addresses. In some embodiments, the L2P mapping information storage circuit 150 is implemented in NVM to retain data after power is shut off.

In an embodiment, information generated and managed in the process of writing data to the memory device 200 may be defined in various terms. As an example, information representing a location where data is stored in the write buffer 130 may be referred to as an address, pointer, or the like, and in embodiments, the information is referred to as a write buffer pointer. Also, information stored in the entry buffer may be referred to as entry information, and the entry information may further include one or more pieces of information, such as a logical address along with the write buffer pointer.

Also, information representing a location where entry information is stored in the entry buffer 140 may be referred to as an entry index, and the entry index may have a value related to a physical storage location of the entry buffer 140. For example, physical addresses of a plurality of storage spaces of the entry buffer 140 may correspond to the entry index. Alternatively, in an example embodiment, the entry index may have a value calculated based on entry information, and as an example, the entry index may be calculated through a hash operation on entry information. Alternatively, the entry index may be calculated through various operations based on entry information, and a location where entry information is stored in the entry buffer 140 may be determined by referring to the entry index.

Meanwhile, the logical address provided from the host may be referred to as a logical page address LPA, a logical page number LPN, and the like, and a physical address may be referred to in terms of a physical page address PPA, a physical page number PPN, and the like, and in the following embodiments, terms of a logical address LPN and a physical address PPN are used as the L2P mapping information for convenience of description.

The memory controller 100 may receive multiple write requests from the host, and a plurality of pieces of entry information related to the plurality of pieces of write data stored in the write buffer 130 may be stored in the entry buffer 140. Each piece of entry information may further include at least one piece of information along with a write buffer pointer indicating a storage location of write data in the write buffer 130. Considering the first write data stored in the write buffer 130 as an example, in the first entry information corresponding to the first write data, a first write buffer pointer indicating a storage location of the first write data in the write buffer 130 may be included. Also, at least one of a first logical address received from the host along with the first write data and a physical address (e.g., an old physical address) previously mapped to the first logical address LPN may be included.

A detailed operation example is as follows. In the following embodiments, for convenience of description, write data may also be referred to as data.

In an example embodiment, before a memory operation (e.g., a NAND operation for physically programming the first data into the cell block CB) is performed on the first data received from the host, a read of the first data may be requested from the host. In this case, the first data temporarily stored in the write buffer 130, not the data programmed in the cell block CB, needs to be provided to the host. In an example embodiment, by efficiently performing information processing or data structure management to reduce the time required to process read requests from the host, along with reducing the resources required for data structure management, it is possible to ensure data coherency.

As an operational example, the L2P information updater 120 may include an entry index updater 121 and a physical address PPN updater 122. The entry index updater 121 and the physical address updater 122 may each be implemented in hardware circuits or by software executed by processor 110. The entry index updater 121 and the physical address updater 122 may each manage an update operation for the L2P mapping information storage circuit 150. The location of a plurality of pieces of entry information stored in the entry buffer 140 may be determined through an entry index. That is, the entry index is an index into the entry buffer 140. The entry index updater 121 may store the first entry index indicating the location where the first entry information is stored in the entry buffer 140 in a storage space corresponding to the first logical address LPN of the L2P mapping information storage circuit 150. Also see FIG. 14B. Accordingly, the information of the storage space corresponding to the first logical address LPN of the L2P mapping information storage circuit 150 may be updated to the first entry index rather than associated with the old physical address previously mapped to the first logical address LPN.

Also, the physical address updater 122 may update information related to the physical address PPN to the L2P mapping information storage circuit 150. For example, the physical address updater 122 may manage mapping information between a logical address LPN and a physical address PPN. The first physical address PPN may be newly mapped to correspond to the first logical address LPN, and after the first data is physically programmed into the memory device 200 or the memory cell array 210, the physical address updater 122 may update the L2P mapping information storage circuit 150 with a first physical address PPN indicating a storage location of the first data in the memory cell array 210. This will overwrite the old PPN previously associated with the LPN identified by the first entry index. See FIG. 15 operation S32.

According to the record request and the first data from the host, the memory controller 100 may store first data in the write buffer 130 and generate first entry information corresponding to the first data, and may generate a first entry index indicating a storage location of the first entry information in the entry buffer 140.

In some embodiments, the following information is thus stored in the memory controller: data from the host to be written to a cell block of memory device 200 is in the write buffer, a mapping of the logical address used by the host to the physical address in the cell block is in an L2P map table, and the location in the write buffer of the data from the host is among the contents of the entry buffer. The contents of the entry buffer are indexed by the entry index. The value of the entry index for specific data from the host temporarily resident in the write buffer is one of the entries in the L2P map table. Some embodiments store the L2P map table and the entry buffer in non-volatile memory along with implementing the write buffer in non-volatile memory. Operations needed for writing to the cell block are simplified and also made robust against sudden power off.

The generation of the first entry information and the first entry index may be generated by hardware based on a hardware circuit implemented in the memory controller 100, or may be performed based on the execution of software under control by the processor 110. Also, the first entry information and the first entry index may be generated based on a combination of hardware and software within the memory controller 100.

Before the first data is programmed into the actual memory cell array 210, a first entry index generated corresponding to the first entry information may be provided to the entry index updater 121. Also, as the first data is programmed into the actual memory cell array 210, the first physical address PPN newly mapped to the first logical address LPN may be provided to the physical address updater 122.

According to the management operation of the L2P information updater 120 as described above, some of the various types of information stored in the L2P mapping information storage circuit 150 may correspond to a physical address PPN indicating a location where data is physically stored actually, but some other types may include entry indexes updated by entry index updater 121. The memory controller 100 may determine whether the corresponding information corresponds to a physical address PPN or an entry index based on information read from the L2P mapping information storage circuit 150.

In an example, a read request of the first data is received from the host before the first data is actually programmed into the memory cell array 210. The memory controller 100 may use the first logical address LPN provided along with the read request from the host to read the first entry index stored in the storage space corresponding to the first logical address LPN in the L2P mapping information storage circuit 150. The memory controller 100 may determine a location where first entry information corresponding to the first data is stored in the entry buffer 140 based on the read first entry index, and accordingly, the first entry information may be read from the entry buffer 140.

In addition, the first entry information read from the entry buffer 140 may include a write buffer pointer indicating a location where the first data is stored in the write buffer 130, and the memory controller 100 may read the first data stored in the write buffer 130 using the write buffer pointer and provide the read first data to the host.

Then, when the NAND operation in which the first data is programmed into the actual memory cell array 210 is completed, the physical address updater 122 may update information in a storage space corresponding to the first logical address of the L2P mapping information storage circuit 150 to a first physical address PPN newly mapped to the first logical address LPN. Accordingly, if reading of the first data is requested from the host after the NAND operation is completed, the first physical address PPN may be read from the L2P mapping information storage circuit 150, and first data may be read from the memory cell array 210 by the read first physical address PPN.

According to an example embodiment as described above, since various types of information (e.g., entry index) that may be managed in the process of writing and reading data may not be stored in a separate storage circuit, but may be stored in the existing L2P mapping information storage circuit 150, an increase in resources for information management may be prevented. In addition, based only on the information stored in the L2P mapping information storage circuit 150, since it may be determined whether the data requested to be read is temporarily stored in the write buffer 130 (hit/miss), the time required to determine whether to store data in the write buffer 130 may be reduced. In addition, since the operation of updating the physical address PPN in the L2P mapping information storage circuit 150 may be performed at the timing when the NAND operation for data is performed (or after the NAND operation is completed), coherency of data may be guaranteed.

Figure 2:
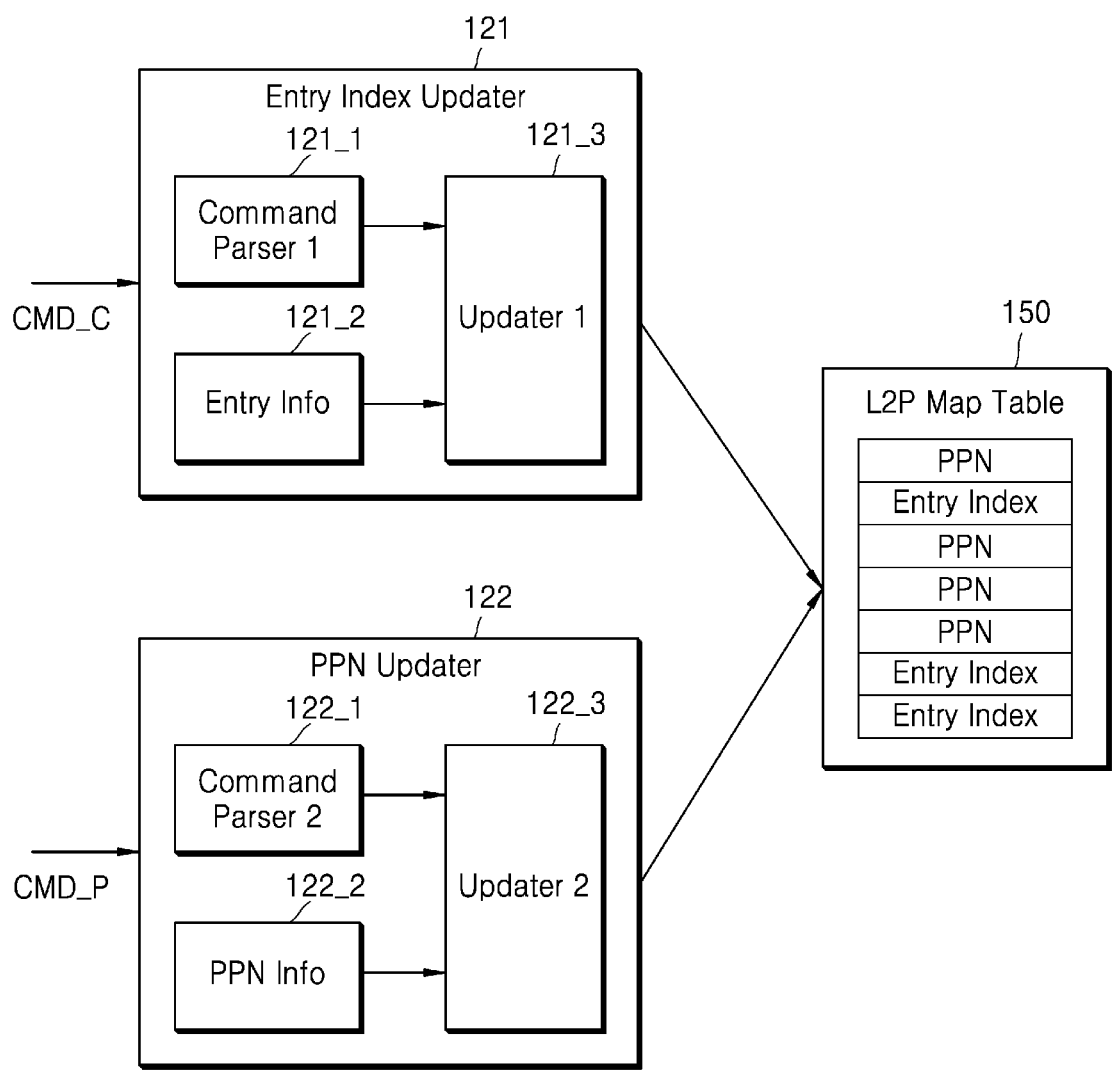
FIG. 2 is a block diagram illustrating an implementation example of an L2P information updater according to an example embodiment.

FIG. 2 is a block diagram illustrating an implementation example of an L2P information updater according to an example embodiment.

Referring to FIGS. 1 and 2, the entry index updater 121 may include a first command parser 121_1, an entry index receiver 121_2, and a first updater 121_3. Also, the physical address updater 122 may include a second command parser 122_1, a physical address receiver 122_2, and a second updater 122_3. In addition, the entry index updater 121 and the physical address updater 122 may manage an update operation for the L2P mapping information storage circuit 150, respectively, and as an example, the entry index updater 121 may update the entry index in the L2P mapping information storage circuit 150, and the physical address updater 122 may update the physical address PPN in the L2P mapping information storage circuit 150.

Each of the first command parser 121_1 and the second command parser 122_1 may determine the type of command based on a parsing operation for various commands generated by the host or memory system. As an example, the first command parser 121_1 may determine reception of a write request or storage of write data in the write buffer 130 based on a command parsing operation, and provide the determination result to the first updater 121_3. As write data according to a write request from the host is temporarily stored in the write buffer 130, the first updater 121_3 may store an entry index generated corresponding to the write data in the L2P mapping information storage circuit 150.

Meanwhile, the second command parser 122_1 may determine whether data requested to be written from the host has been programmed into the memory device 200 or whether a response indicating that the programming has been completed has been received from the memory device 200, based on the parsing operation for the command. Also, the physical address receiver 122_2 may receive the physical address PPN newly mapped to the logical address LPN from the host and provide the received physical address PPN to the second updater 122_3. The second updater 122_3 may update the physical address PPN in the storage space corresponding to the logical address LPN from the host as data requested to be written is programmed into the memory device 200.

The L2P mapping information storage circuit 150 may store entry indices and physical addresses PPN corresponding to a plurality of logical addresses LPN. In an example embodiment, when the entry index is stored in the storage space of the L2P mapping information storage circuit 150, data corresponding to the entry index may not yet be programmed into a memory cell array and may be stored in the write buffer 130 in the memory controller. On the other hand, when the physical address PPN is stored in the storage space of the L2P mapping information storage circuit 150, data corresponding to the physical address PPN may be in a state in which programming is completed in the memory device 200.

Figure 3:
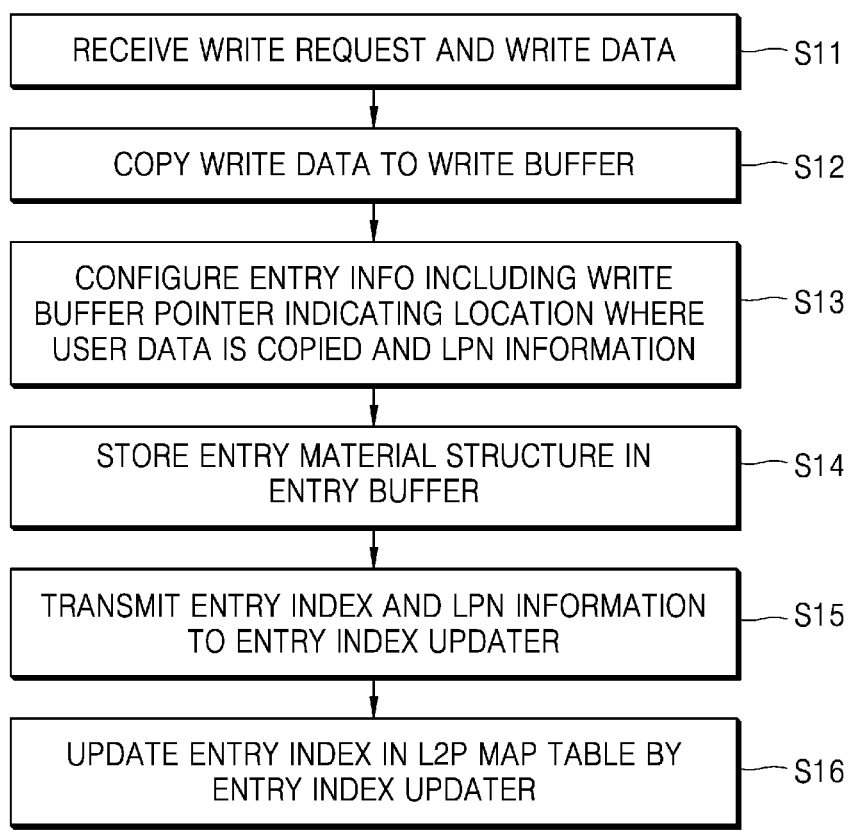
FIGS. 3 and 4 are flowcharts illustrating a method of operating a memory system, according to an example embodiment.
Figure 4:
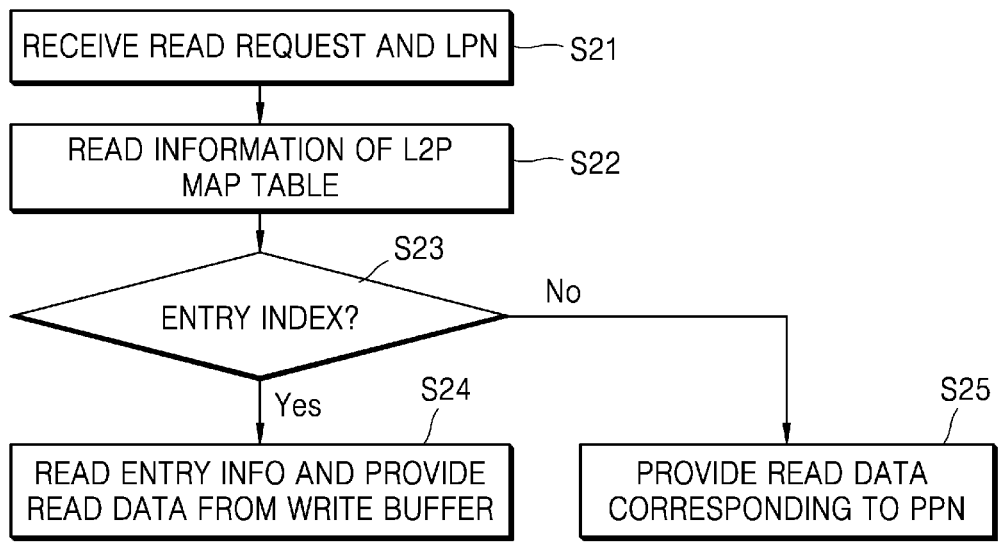

FIGS. 3 and 4 are flowcharts illustrating a method of operating a memory system, according to an example embodiment.

Referring to FIGS. 1 to 3, the memory system may receive a write request and write data (or user data) from the host in S11, and the received write data may be copied to a write buffer provided in a memory controller in the memory system in S12. In addition, entry information including a write buffer pointer indicating the location where the write data in the write buffer was copied and a logical address LPN included in the write request from the host (or provided along with the write request) may be configured in S13.

Entry information having the entry data structure created as described above may be stored in the entry buffer in S14. In addition, an entry index indicating a location where the entry information is stored in the entry buffer may be created, and the generated entry index and the logical address LPN from the host may be transmitted to the entry index updater in S15. In addition, as the write data from the host is stored in the write buffer, the entry index updater may update the entry index in the storage space corresponding to the logical address LPN of the L2P mapping information storage circuit 150 in S16.

Meanwhile, referring to FIGS. 1 to 4, the memory system may receive a read request and a logical address LPN from the host in S21. As the program in the memory device is not completed, the data requested to be read may be temporarily stored in a write buffer in the memory controller, or as the programming of the memory device is completed, the data requested to be read may be stored in a cell block of the memory device.

The memory controller in the memory system may read information from the storage space corresponding to the logical address LPN in the L2P mapping information storage circuit 150 based on the logical address LPN provided from the host in S22. In addition, it may be determined whether the read information is an entry index in S23, and if the read information corresponds to the entry index, a write buffer pointer included in the entry information may be checked using entry information read at a position indicated by the entry index in the entry buffer. In addition, data read from a location indicated by the write buffer pointer in the write buffer may be provided to the host as read data in S24. On the other hand, when the read information corresponds to the physical address PPN, the memory controller may receive data read from a location corresponding to the physical address PPN by providing the physical address PPN to the memory device, and provide the data read from the memory device to the host as read data in S25.

Figure 5:
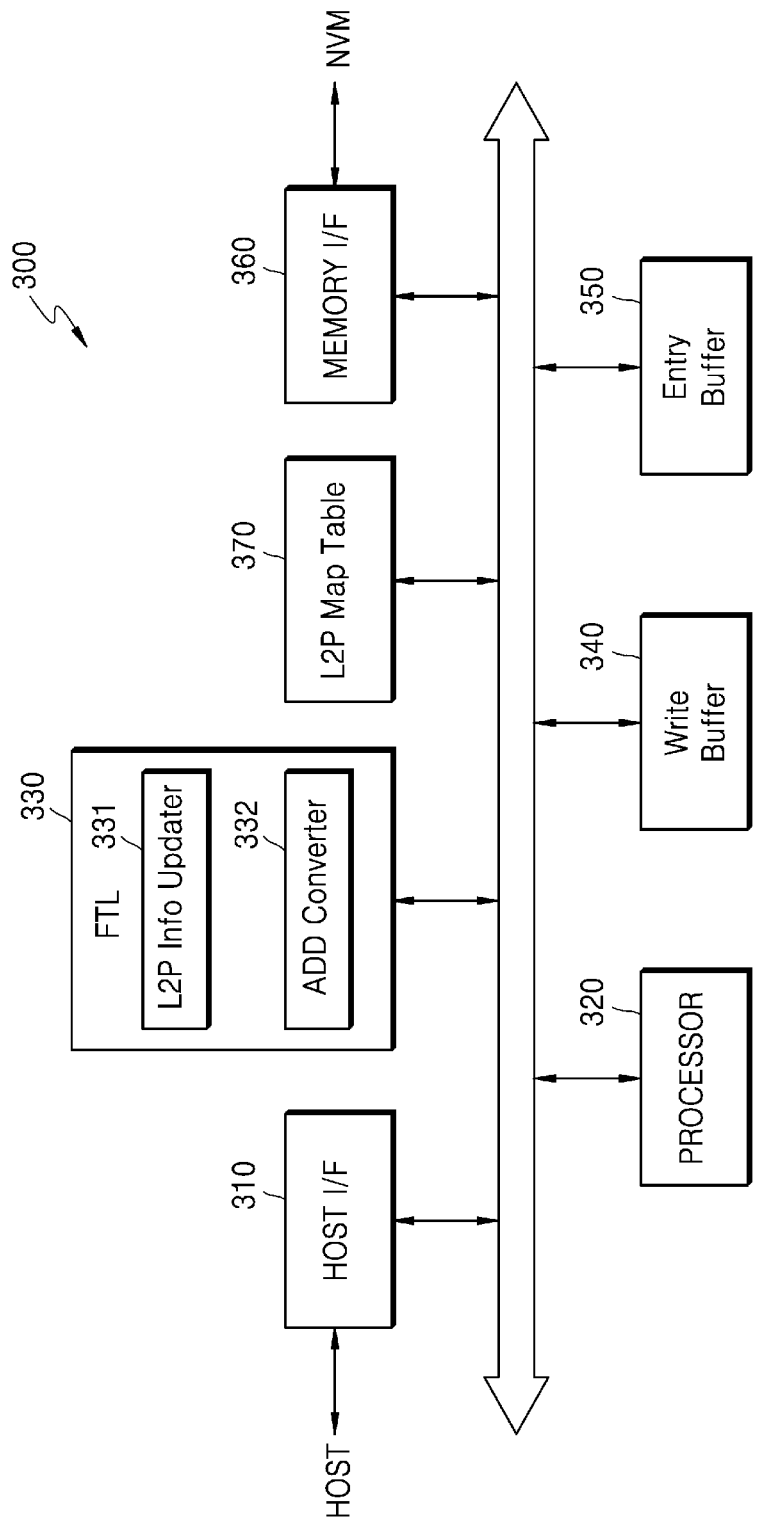
FIG. 5 is a block diagram illustrating an implementation example of a memory controller according to an example embodiment.

FIG. 5 is a block diagram illustrating an implementation example of a memory device according to an embodiment.

Referring to FIG. 5, a memory controller 300 may include a host interface 310, a processor 320, a working memory 330, a write buffer 340, an entry buffer 350, a memory interface 360, and an L2P mapping information storage circuit 370. FIG. 5 shows that the write buffer 340, the entry buffer 350, and the L2P mapping information storage circuit 370 are disposed outside the working memory 330, but in various embodiments, at least a part of the write buffer 340, the entry buffer 350, and the L2P mapping information storage circuit 370 may be included in the working memory 330 or may include a part of the working memory 330. Alternatively, the memory controller 300 may communicate with an external volatile memory (e.g., cache memory, dynamic random access memory (DRAM), static random access memory (SRAM), etc.) to control a data access operation for the external volatile memory, and at least a part of the write buffer 340, the entry buffer 350, and the L2P mapping information storage circuit 370 may be included in an external volatile memory. In this case, components included in the external volatile memory may be defined as not being included in the memory controller 300.

The processor 320 may control the overall operation of the memory controller 300 by executing firmware or programs loaded into the working memory 330. The working memory 330 may be implemented with various types of memory, and may be implemented with, for example, at least one of cache memory, DRAM, SRAM, and resistive memory. Also, as an example of firmware, when the memory controller 300 controls a flash memory device, a flash translation layer FTL may be loaded into the working memory 330, and various functions related to flash memory operations may be performed by the processor 320 executing the flash translation layer FTL.

The host interface 310 may communicate with the host through various types of interfaces according to the above-described embodiments. Also, the memory interface 360 provides a physical connection between the memory controller 300 and a memory device (e.g., a nonvolatile memory device NVM). For example, commands/addresses and data may be transmitted and received between the memory controller 300 and the nonvolatile memory device NVM through the memory interface 360.

Data requested to be written from the host and data read from the nonvolatile memory device NVM may be temporarily stored in the write buffer 340. In addition, entry information corresponding to one or more pieces of data stored in the write buffer 340 may be stored in the entry buffer 350 according to the above-described embodiments, and each of pieces of entry information may include a write buffer pointer indicating a storage location in the write buffer 340 in relation to the corresponding data, and may also include at least one of a logical address corresponding to data and an old physical address. In addition, the L2P mapping information storage circuit 370 may store physical addresses mapped to a plurality of logical addresses, and according to example embodiments, for some logical addresses, entry indexes other than physical addresses may be stored in the L2P mapping information storage circuit 370. In addition, if the entry information includes the old physical address, even if the old physical address previously stored is deleted as the entry index is updated in the L2P mapping information storage circuit 370, an old physical address previously mapped to a logical address may be identified through entry information corresponding to the entry index.

In an example embodiment, an identifier indicating whether information stored about a logical address corresponds to an entry index or a physical address may be further stored in the L2P mapping information storage circuit 370. In addition, in the above-described embodiment, the case where the location of the storage space in the L2P mapping information storage circuit 370 corresponds to the above-described logical address and information indicating a physical address mapped thereto is stored in the storage space has been exemplified, but embodiments need not be limited thereto. As an example, in order that information indicating a logical address and information indicating a physical address (or entry index) mapped thereto are stored together in each storage space of the L2P mapping information storage circuit 370, the L2P mapping information storage circuit 370 may be implemented.

In an example embodiment, the flash translation layer FTL may include an L2P information updater 331 and an address translator 332 implemented in software. The L2P information updater 331 may include an entry index updater and a physical address updater according to the above-described embodiments. When a write request, a logical address, and data corresponding thereto are received through the host interface 310, the received data may be stored in the write buffer 340, and entry information including a write buffer pointer indicating a storage location of data in the write buffer 340 may be stored in the entry buffer 350. Also, the entry index updater may store the entry index corresponding to the generated entry information (or, capable of determining the generated entry information) in a storage space corresponding to a logical address of the L2P mapping information storage circuit 370. In addition, when the data stored in the write buffer 340 is programmed into the nonvolatile memory device NVM through a NAND operation, the physical address updater may update the L2P mapping information storage circuit 370 with a physical address newly mapped to the logical address.

In the above embodiment, the case where the function of the L2P information updater 331 is implemented in software is exemplified, but embodiments are not necessarily limited thereto, and at least some of the functions performed by the L2P information updater 331 may be implemented as hardware circuits.

Figure 6:
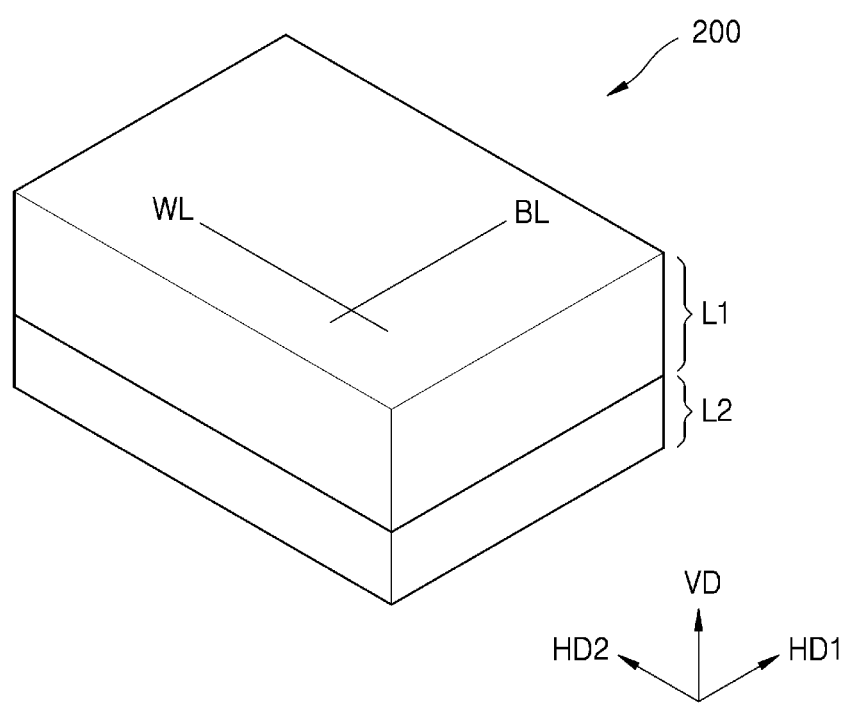
FIG. 6 is a diagram schematically illustrating a structure of the memory device of FIG. 1 according to an example embodiment.
Figure 7:
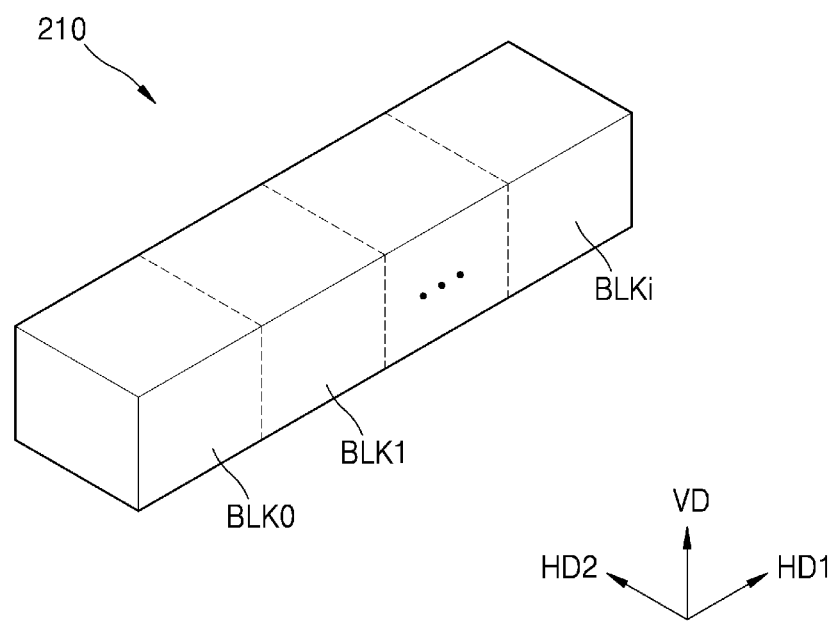
FIG. 7 is a diagram illustrating the memory cell array of FIG. 1 by way of example.
Figure 8:
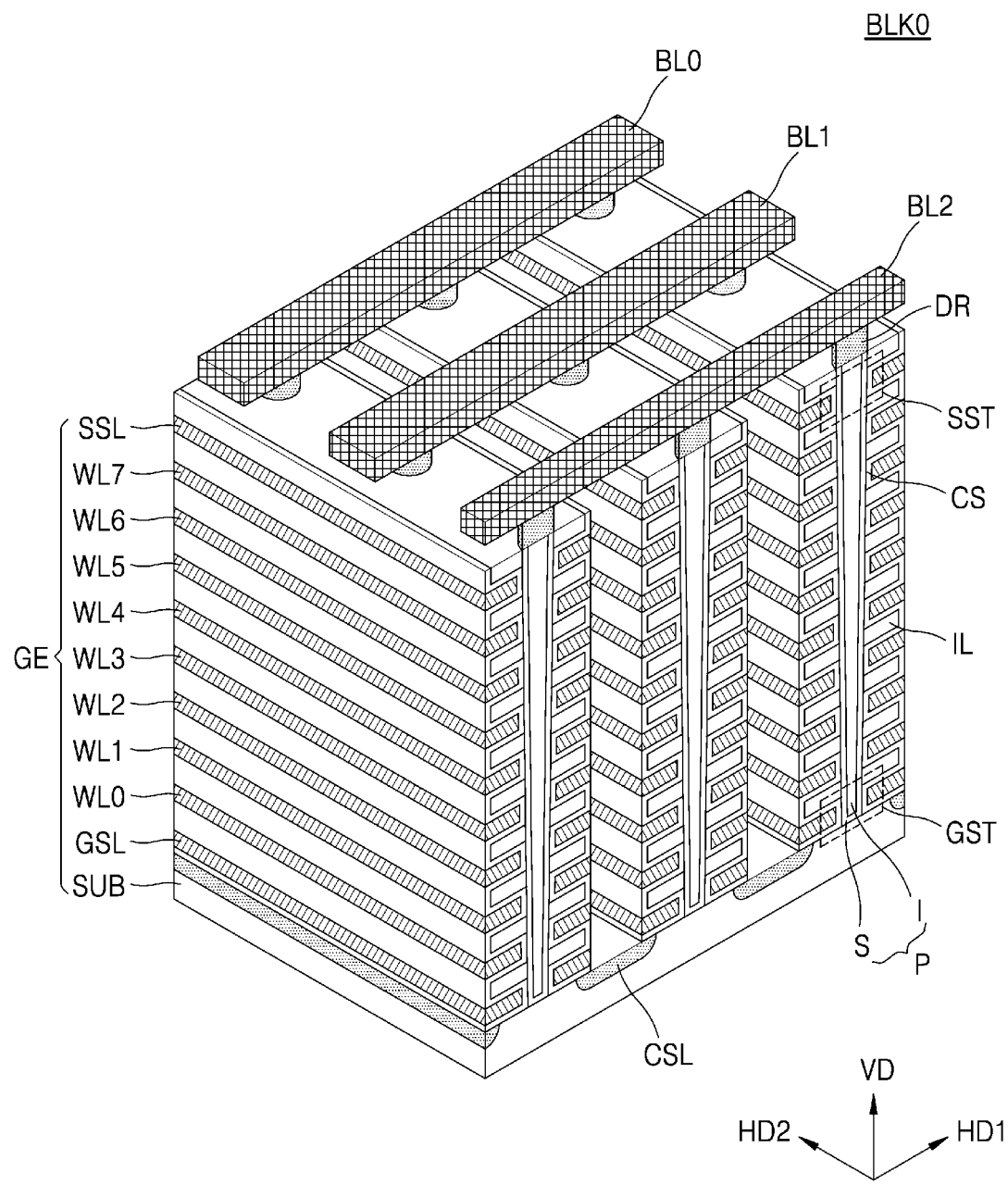
FIG. 8 is a perspective view illustrating an example of a structure of a cell block of FIG. 7.

FIG. 6 is a diagram schematically illustrating a structure of the memory device of FIG. 1 according to an embodiment, FIG. 7 is a diagram exemplarily illustrating the memory cell array of FIG. 1, and FIG. 8 is a perspective view illustrating an example of a structure of a cell block of FIG. 7. In FIG. 6, a Cell Over Periphery (COP) structure is exemplified as an example of implementing a memory device, but embodiments may be implemented as a memory device through various structures without being limited thereto.

Referring to FIG. 6, a memory device 200 may include a first semiconductor layer L1 and a second semiconductor layer L2, and the first semiconductor layer L1 may be stacked in a direction VD perpendicular to the second semiconductor layer L2. Specifically, the second semiconductor layer L2 may be disposed below the first semiconductor layer L1 in a vertical direction VD, and thus, the second semiconductor layer L2 may be disposed close to the substrate.

In one embodiment, the memory cell array 210 of FIG. 1 may be formed on the first semiconductor layer L1, and other peripheral circuits of FIG. 1 may be formed on the second semiconductor layer L2. Accordingly, the memory device 200 may have a structure in which the memory cell array 210 is disposed on top of a peripheral circuit, that is, a COP structure. The COP structure may effectively reduce an area in a horizontal direction and improve the degree of integration of the memory device 200.

In one embodiment, the second semiconductor layer L2 may include a substrate, and a peripheral circuit may be formed on the second semiconductor layer L2 by forming transistors and metal patterns for wiring the transistors on the substrate. After the peripheral circuit is formed on the second semiconductor layer L2, a first semiconductor layer L1 including the memory cell array 210 may be formed, and metal patterns may be formed to electrically connect the word lines WL and bit lines BL of the memory cell array 210 and a peripheral circuit formed on the second semiconductor layer L2. For example, the bit lines BL may extend in the first horizontal direction HD1, and the word lines WL may extend in the second horizontal direction HD2.

Meanwhile, referring to FIG. 7, the memory cell array may include a plurality of cell blocks BLK0 to BLKi, and i may be a positive integer. Each of the plurality of cell blocks BLK0 to BLKi may have a 3D structure (or vertical structure). Specifically, each of the plurality of cell blocks BLK0 to BLKi may include a plurality of NAND strings extending in the vertical direction VD. In this case, the plurality of NAND strings may be provided to be spaced apart by a specific distance in the first and second horizontal directions HD1 and HD2. The plurality of cell blocks BLK0 to BLKi may be selected by a row decoder (not shown) of the memory device 200. For example, the row decoder may select a cell block corresponding to a block address from among a plurality of cell blocks BLK0 to BLKi.

Meanwhile, referring to FIG. 8, the cell block BLK0 is formed in a direction perpendicular to the substrate SUB. The substrate SUB has a first conductivity type (e.g., p-type) and extends in the second horizontal direction HD2 on the substrate SUB, and a common source line CSL doped with impurities of a second conductivity type (e.g., n-type) is provided. On the region of the substrate SUB between two adjacent common source lines CSL, a plurality of insulating films IL extending in the second horizontal direction HD2 are sequentially provided in the vertical direction VD, and the plurality of insulating films IL are spaced apart from each other by a particular distance in the vertical direction VD. For example, the plurality of insulating films IL may include an insulating material, such as silicon oxide.

On the region of the substrate SUB between two adjacent common source lines CSL, a plurality of pillars P sequentially disposed in the first horizontal direction HD1 and penetrating the plurality of insulating films IL in the vertical direction VD are provided. For example, the plurality of pillars P may penetrate the plurality of insulating films IL to contact the substrate SUB. Specifically, a surface layer S of each pillar P may include the first type of silicon material and function as a channel region. Meanwhile, the inner layer I of each pillar P may include an insulating material, such as silicon oxide or an air gap.

In a region between two adjacent common source lines CSL, a charge storage layer CS is provided along exposed surfaces of the insulating films IL, the pillars P, and the substrate SUB. The charge storage layer CS may include a gate insulating layer (also referred to as a 'tunneling insulating layer'), a charge trap layer, and a blocking insulating layer. For example, the charge storage layer CS may have an oxide-nitride-oxide (ONO) structure. Also, in a region between two adjacent common source lines CSL, gate electrodes GE, such as select lines GSL and SSL and word lines WL0 to WL7 are provided on the exposed surface of the charge storage layer CS.

Drains or drain contacts DR are provided on the plurality of pillars P, respectively. For example, the drains or the drain contacts DR may include a silicon material doped with impurities having the second conductivity type. Bit lines BL1 to BL3 extending in the first horizontal direction HD1 and spaced apart from each other by a particular distance in the second horizontal direction HD2 are provided on the drains DR.

Figure 9A:
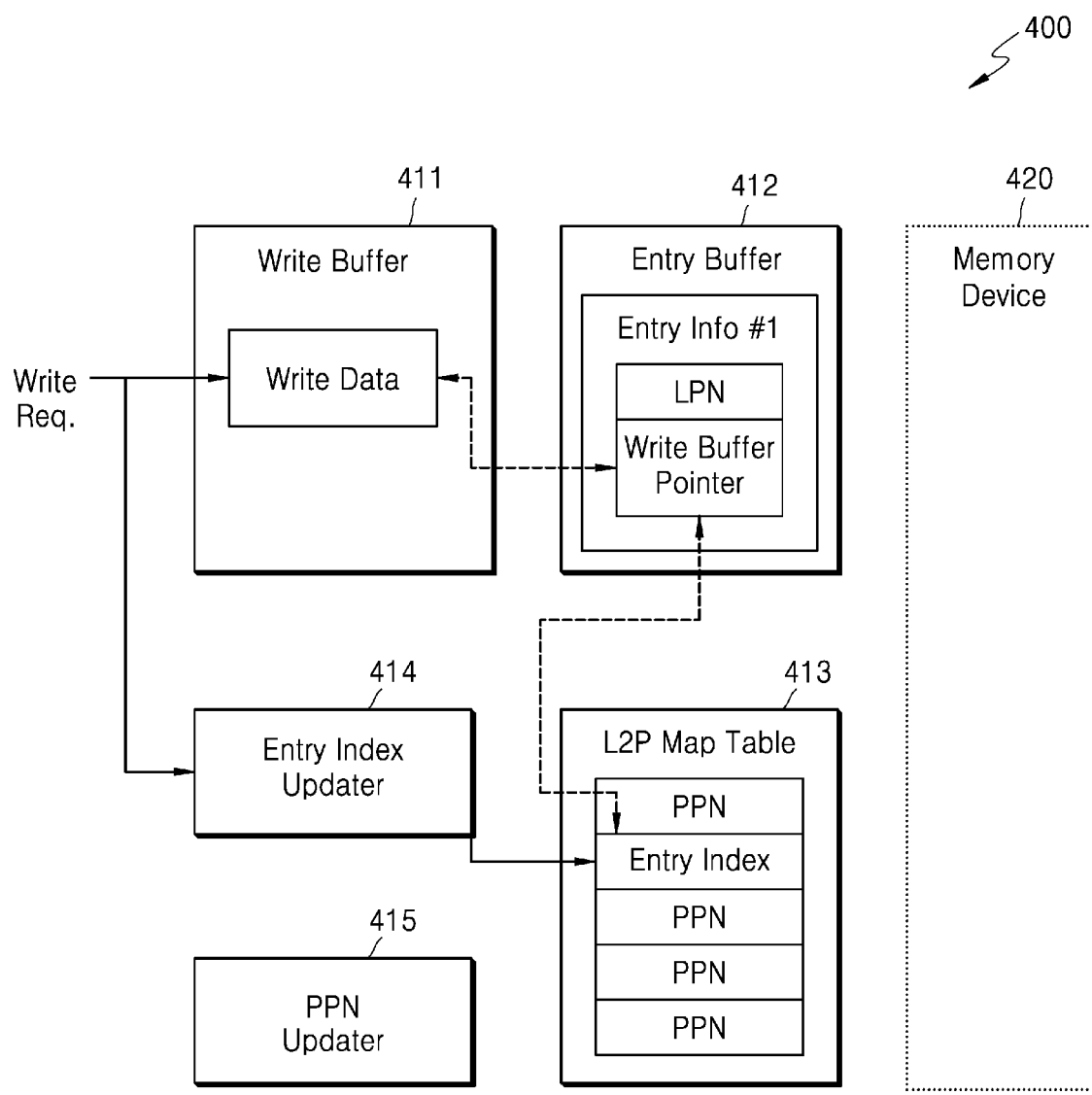
FIGS. 9A and 9B are block diagrams illustrating an example operation of an L2P information updater in an example embodiment.
Figure 9B:
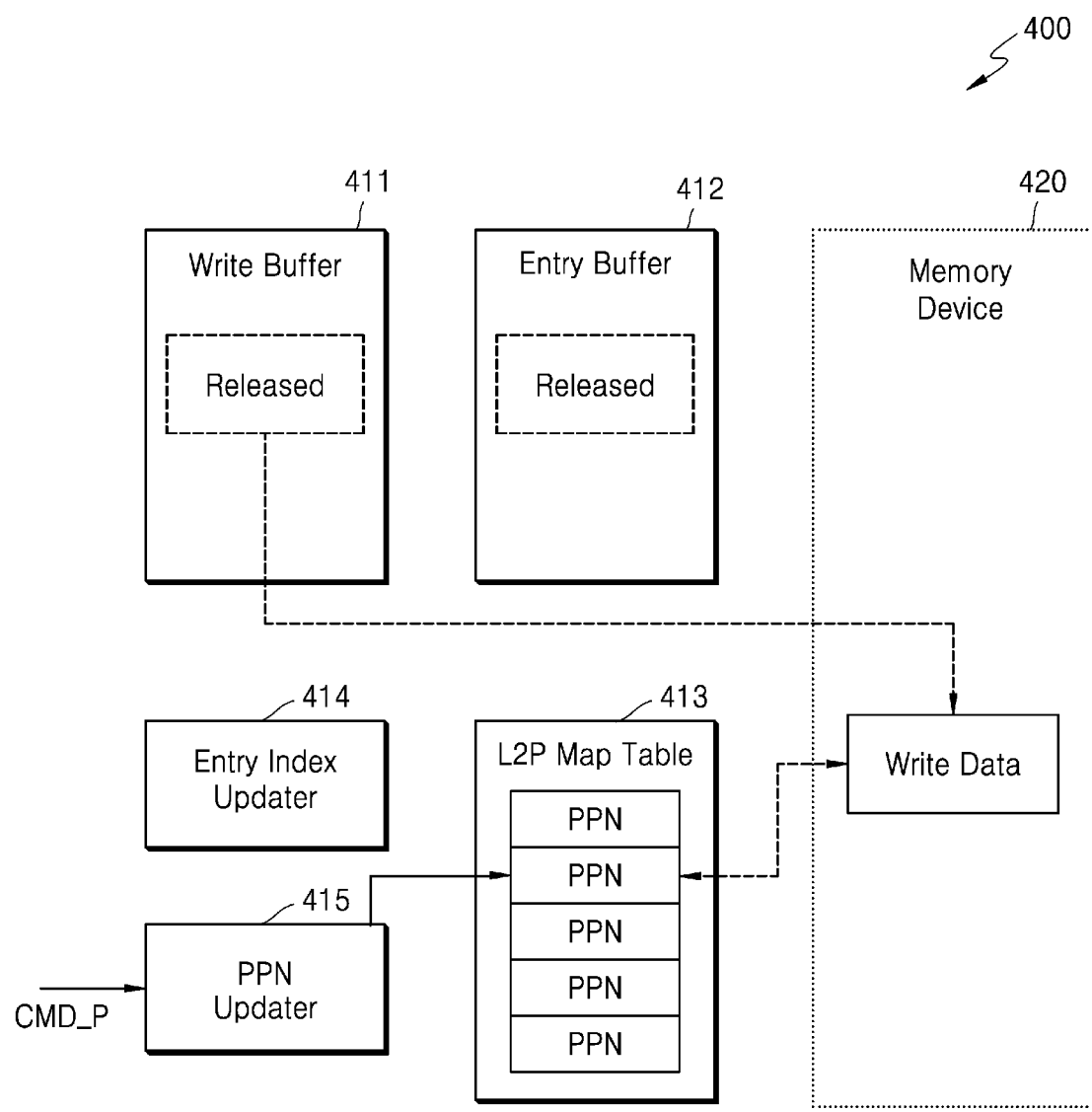

FIGS. 9A and 9B are block diagrams illustrating an example operation of an L2P information updater in an example embodiment.

Referring to FIG. 9A, a memory system 400 may include a memory controller and a memory device 420, and the memory controller may include a write buffer 411, an entry buffer 412, an L2P mapping information storage circuit 413, an entry index updater 414, and a physical address updater 415.

According to a write request from the host, the memory system 400 may receive write data and a logical address LPN corresponding thereto from the host, and the write data may be temporarily stored in the write buffer 411. In addition, based on a control operation (e.g., a program execution operation of a processor) in the memory controller, first entry information Entry Info #1 corresponding to the write data may be generated, and the first entry information Entry Info #1 may be stored in the entry buffer 412. In an example embodiment, the first entry information Entry Info #1 may include a write buffer pointer and a logical address LPN.

In addition, an entry index including information for determining the first entry information Entry Info #1 or checking the storage location of the first entry information Entry Info #1 may be generated and provided to the entry index updater 414, and as the write data is stored in the write buffer 411, the entry index updater 414 may store the entry index in a storage space corresponding to the logical address LPN in the L2P mapping information storage circuit 413.

Meanwhile, as shown in FIG. 9B, data temporarily stored in the write buffer 411 may be programmed into the memory device 420, and a physical address PPN indicating a physical location of data programmed in the memory device 420 may be provided to the physical address updater 415. As the write data is programmed into the memory device 420, the physical address updater 415 may update an entry index stored in a storage space corresponding to the logical address LPN in the L2P mapping information storage circuit 413 to a newly mapped physical address PPN.

In an example embodiment, the physical address updater 415 may determine update timing of the physical address PPN based on various types of commands used in the memory system 400, and as an example, may determine update timing of the physical address PPN based on the program command C_PGM indicating the program of data. Alternatively, in an example embodiment, as the memory device 420 provides a completion response (not shown) indicating that the program operation has been completed, to the memory controller, the physical address updater 415 may determine the update timing of the physical address PPN based on the completion response. Also, as data programming is completed, the write data stored in the write buffer 411 and the first entry information Entry Info #1 stored in the entry buffer 412 may be released.

In addition to the above-described embodiments, the update timing of the entry index and the update timing of the physical address PPN may be determined in various ways. For example, the memory system 400 may determine update timing of an entry index based on various external or internal commands, such as receiving a write request, sending a request response to the host, generating entry information and/or entry index, and storing entry information in the entry buffer 412. Also, the memory system 400 may determine update timing of the physical address PPN based on various types of commands related to a NAND operation for data writing, or according to various methods such as timing when a new physical address PPN is mapped.

Figure 10:
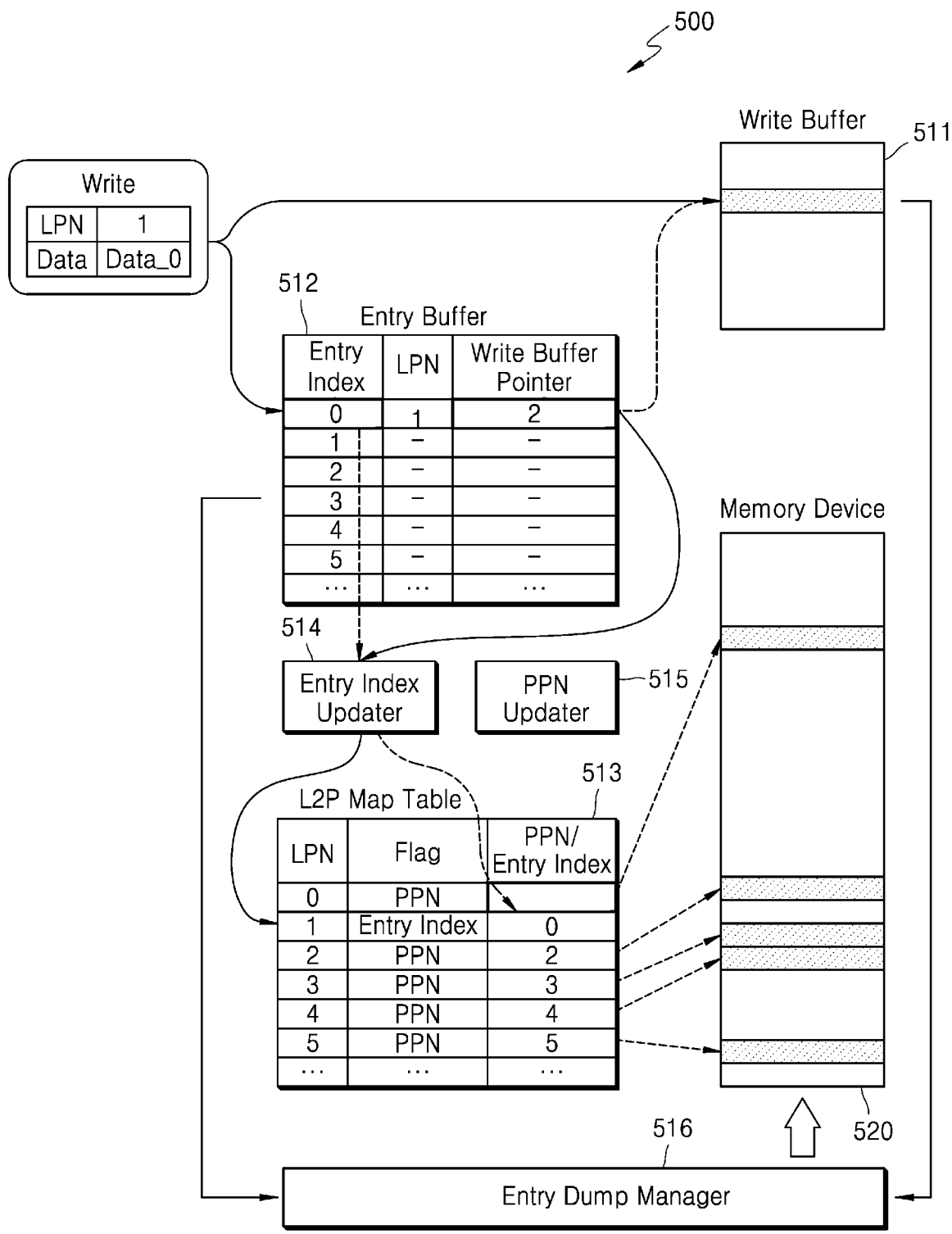
FIG. 10 is a block diagram illustrating a concrete information storage example according to an example embodiment.

FIG. 10 is a block diagram illustrating a concrete information storage example according to an example embodiment. According to the above-described embodiments, a memory system 500 may include a write buffer 511, an entry buffer 512, an L2P mapping information storage circuit 513, an entry index updater 514, a physical address updater 515, and a memory device 520.

Referring to FIG. 10, write data Data_0 and a logical address LPN with a value of "1" may be received along with a write request from the host, and write data Data_0 may be temporarily stored in the location indicated by the write buffer pointer of "2" in the write buffer 511, and first entry information including a logical address LPN with a value of "1" provided from the host and a write buffer pointer with a value of "2" may be generated. In addition, the first entry information may be stored in the entry buffer 512 at a location indicated by an entry index of "0", and the entry index may be provided to the entry index updater 514.

The entry index updater 514 may store the entry index in the L2P mapping information storage circuit 513 as write data Data_0 may be stored in the write buffer 511, and as an example, the L2P mapping information storage circuit 513 may store an entry index having a value of "0" in a storage space corresponding to a logical address LPN of a value of "1". In addition, in an example embodiment, the L2P mapping information storage circuit 513 may further store an identifier for distinguishing an entry index and a physical address PPN, and as an example, flag information Flag having different values corresponding to the entry index and the physical address PPN may be stored. For example, an entry index may be stored in a storage space having flag information Flag of "0" value, whereas a physical address PPN may be stored in a storage space having flag information Flag of "1" value.

The memory controller or the memory system 500 may determine whether write data programming is completed based on information stored in the L2P mapping information storage circuit 513. As an example, when the flag information Flag may be read from the L2P mapping information storage circuit 513 and the flag information Flag has a value of "1", data stored in a location corresponding to the physical address PPN of the memory device 520 may be valid data. On the other hand, when the flag information Flag has a value of "0", write data temporarily stored in the write buffer 511 may be determined based on the entry information that may be referred to by the entry index, and an operation of programming the write data temporarily stored in the write buffer 511 into the memory device 520 may be performed.

Meanwhile, in an example embodiment, the memory system 500 may further include an entry dump manager 516. The entry dump manager 516 may determine a situation in which write data is stored in the write buffer 511 or entry information is stored in the entry buffer 512, and control an operation for dumping (or backing up) various types of information to the memory device 520 in response to an abnormal situation, such as sudden power-off. For example, the entry dump manager 516 may manage a dump operation of at least some of the write data, the entry information, and the mapping information described in the embodiments above.

FIG. 11 is a diagram illustrating an information storage example of an L2P mapping information storage circuit according to an example embodiment.

Referring to FIG. 11, the L2P mapping information storage circuit includes storage spaces corresponding to a plurality of logical addresses LPN, and a physical address PPN or an entry index may be stored in each storage space. Information capable of determining a physical address PPN and an entry index may be stored in the L2P mapping information storage circuit, and as an example, a case in which separate flag information is not stored in the L2P mapping information storage circuit and the entry index is determined according to a specific pattern of at least one bit included in the entry index or physical address PPN is exemplified.

In the example shown in FIG. 11, a case in which an entry pattern is added to an entry index is exemplified, and the above-described entry index in an example embodiment may be defined to include bits of the entry index and bits of the entry pattern. As an example, the bits of the entry pattern may include a specific pattern, and when the specific pattern described above is detected in the storage space of the L2P mapping information storage circuit, it may be determined that the entry index is stored in the corresponding storage space.

Although not shown in FIG. 11, the physical address PPN and the entry index may be determined through at least one bit included in the physical address PPN according to example embodiments. For example, an unused area may exist in the bit range of the physical address PPN, and a specific pattern including at least one bit defined according to a predetermined interface may be included in the unused area. For example, when a specific pattern included in the physical address PPN is detected in the storage space of the L2P mapping information storage circuit, it may be determined that the physical address PPN is stored in the corresponding storage space. On the other hand, when a pattern corresponding to a specific pattern included in the physical address PPN is not detected in the storage space of the L2P mapping information storage circuit, it may be determined that the entry index is stored in the corresponding storage space.

FIGS. 12A, 12B, 12C, and 12D are block diagrams illustrating various implementation examples of components according to example embodiments.

In a memory system according to embodiments, the write buffer, the entry buffer, and the L2P mapping information storage circuit may be implemented with various types of volatile memories, and also, the write buffer, the entry buffer, and the L2P mapping information storage circuit may be included in volatile memory in the memory controller. Alternatively, in an example embodiment, the memory system may include a memory controller and a nonvolatile memory device, and may further include a volatile memory temporarily storing information related to a memory operation, and at least some of the write buffer, the entry buffer, and the L2P mapping information storage circuit may be included in a volatile memory outside the memory controller.

On the other hand, the embodiments need not be limited to the above structure, and at least one of the write buffer, the entry buffer, and the L2P mapping information storage circuit may be included in a nonvolatile memory (e.g., resistive memory) in the memory controller, or may be included in a nonvolatile memory outside the memory controller.

In an example embodiment, each of the SRAM and DRAM illustrated in FIGS. 12A, 12B, 12C, and 12D may be included in a memory controller or disposed outside the memory controller. In the following embodiments, it is assumed that SRAM is disposed inside the memory controller and DRAM is disposed outside the memory controller.

Figure 12A:
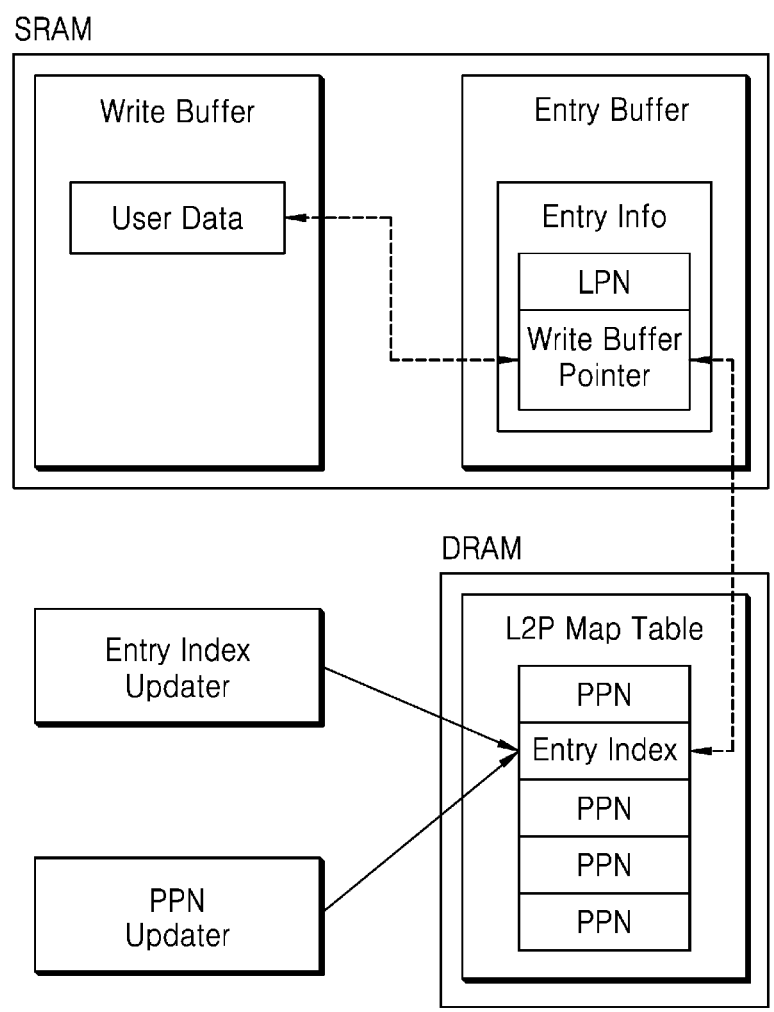
FIGS. 12A, 12B, 12C, and 12D are block diagrams illustrating various implementation examples of components according to example embodiments.

Referring to FIG. 12A, the write buffer and the entry buffer may be implemented with SRAM, and the circuit for storing L2P mapping information may be implemented with DRAM. In an example embodiment, the write buffer and the entry buffer may be included in the memory controller, and the L2P mapping information storage circuit may be included in DRAM outside the memory controller. When write data is temporarily stored in the write buffer based on an internal control operation, the memory controller may generate entry information corresponding to the write data and store the generated entry information in the entry buffer. Also, as the entry information is stored in the entry buffer, the memory controller may store the entry index in a storage space corresponding to the logical address LPN of the L2P mapping information storage circuit through communication with external DRAM. In addition, according to the above-described embodiments, as the write data is programmed into the memory device, the memory controller may update the physical address PPN in the storage space corresponding to the logical address LPN of the L2P mapping information storage circuit through communication with external DRAM.

Figure 12B:
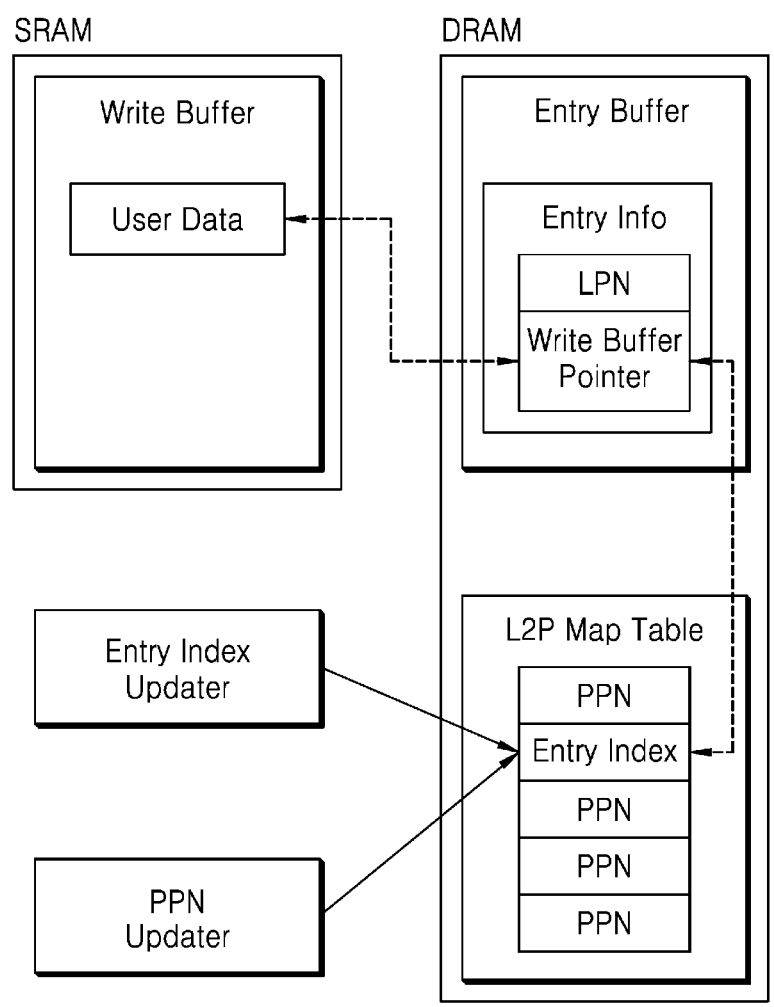

Meanwhile, referring to FIG. 12B, the write buffer may be implemented with SRAM, and the entry buffer and the circuit for storing L2P mapping information may be implemented with DRAM. The memory controller may temporarily store write data in the write buffer based on an internal control operation, and may also store entry information in the entry buffer through communication with external DRAM. In addition, the memory controller may store an entry index corresponding to entry information in a storage space corresponding to a logical address LPN of an L2P mapping information storage circuit through communication with external DRAM, and after that, as the program of the write data is completed, the memory controller may update the physical address PPN in the storage space corresponding to the logical address LPN.

Figure 12C:
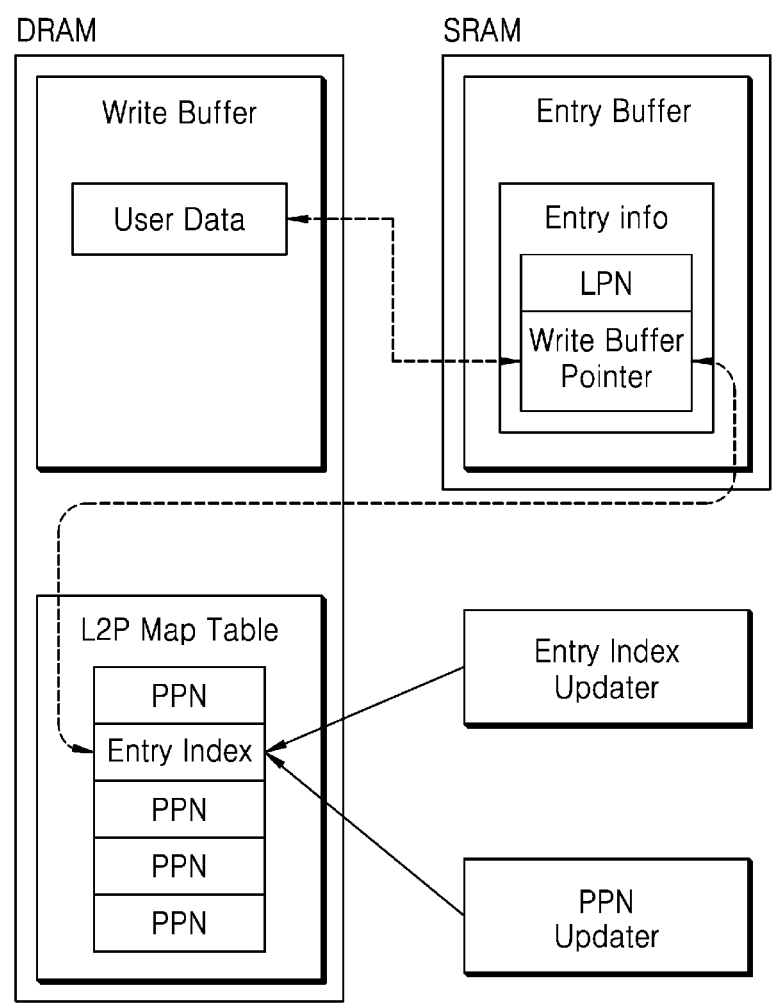

Meanwhile, referring to FIG. 12C, the entry buffer may be implemented with SRAM, and the write buffer and the circuit for storing L2P mapping information may be implemented with DRAM. The memory controller may temporarily store write data in the write buffer through communication with external DRAM, and also, store an entry index generated corresponding to write data in a storage space corresponding to a logical address LPN of an L2P mapping information storage circuit. Also, the memory controller may store entry information generated corresponding to write data in an entry buffer inside the memory controller.

Figure 12D:
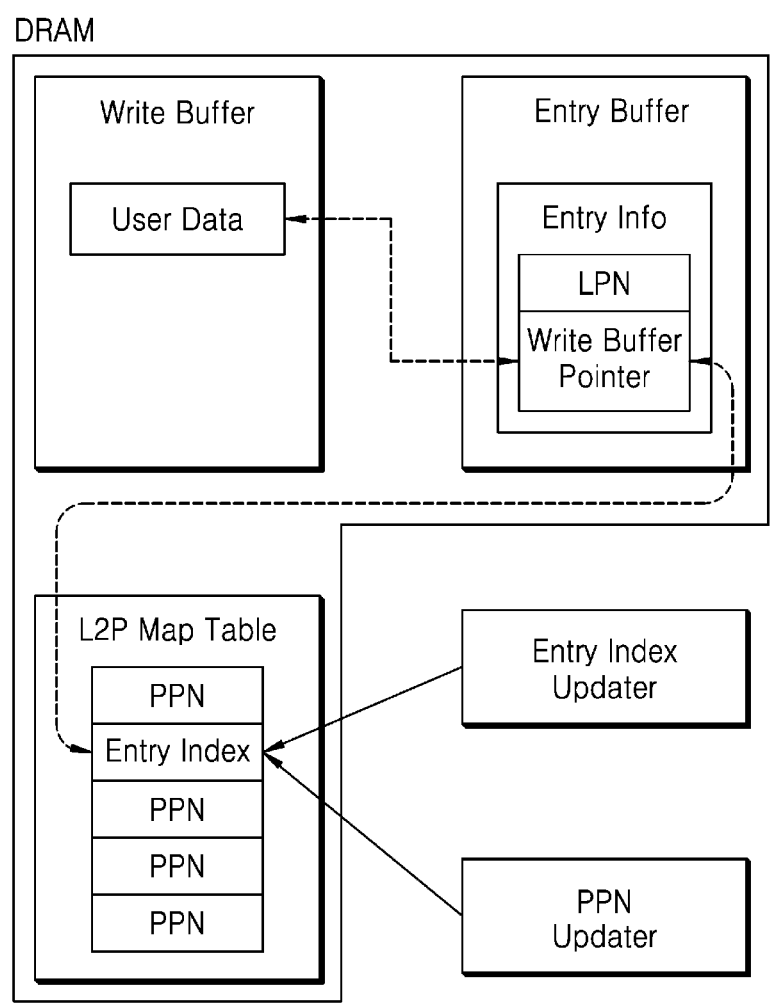

Meanwhile, referring to FIG. 12D, a write buffer, an entry buffer, and a circuit for storing L2P mapping information may be implemented as DRAM. The memory controller may temporarily store various types of information related to a data write operation in the external DRAM through communication with the external DRAM. For example, the memory controller may temporarily store write data in a write buffer included in external DRAM, and store entry information and an entry index generated in relation to the write data in an external DRAM. Also, the memory controller may update an entry index stored in the L2P mapping information storage circuit to a physical address PPN as write data is programmed into the memory device.

Figure 13A:
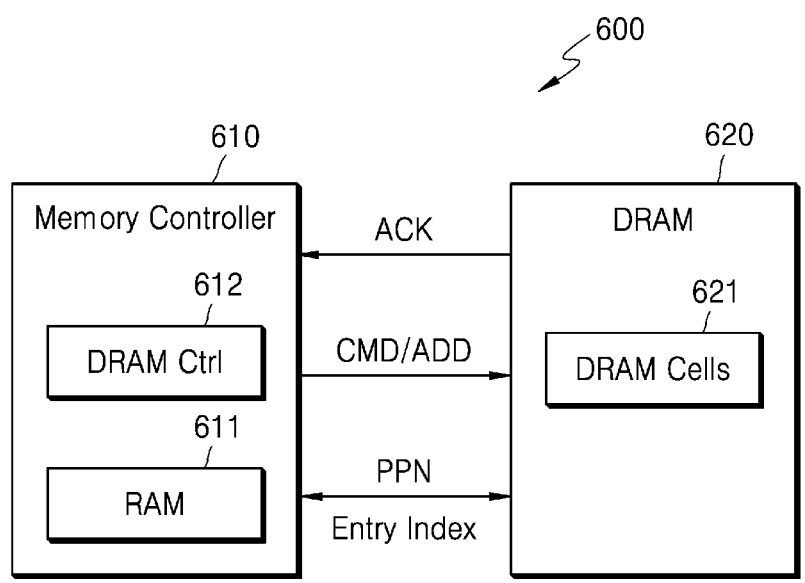
FIGS. 13A and 13B are diagrams illustrating an example of a DRAM control operation of a memory controller according to an example embodiment.
Figure 13B:
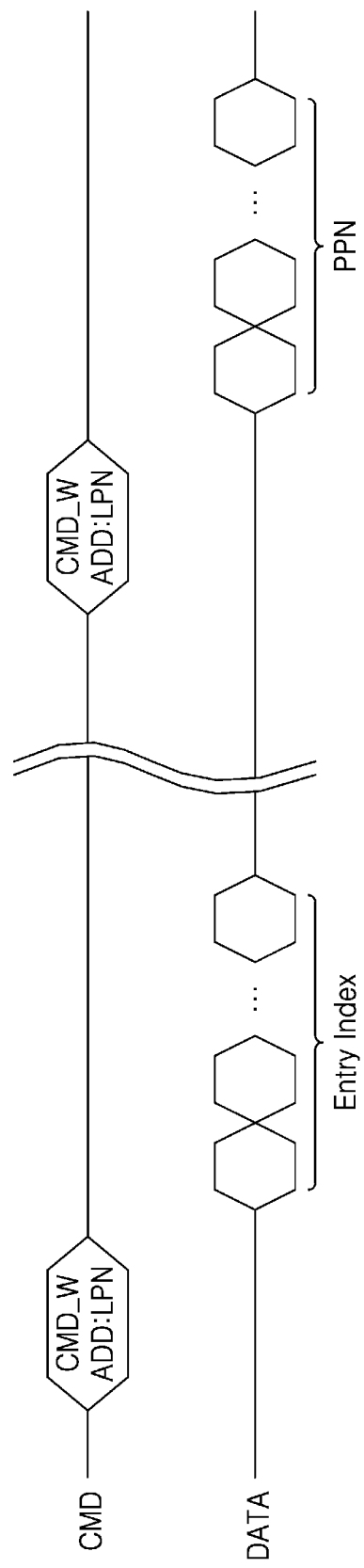

FIGS. 13A and 13B are diagrams illustrating an example of a DRAM control operation of a memory controller according to an example embodiment.

As disclosed with reference to FIG. 13A, a memory system 600 may include DRAM 620 disposed inside or outside a memory controller 610 together with the memory controller 610 in the above-described embodiments. Also, although not shown in FIG. 13A, the memory system 600 may further include a nonvolatile memory device according to the above-described embodiments.

The memory controller 610 may include DRAM control logic (or a DRAM controller 612) for controlling access operations of RAM 611 and the DRAM 620. The RAM 611 may store at least some of various types of information mentioned in the above-described embodiments, and may store entry information and write data as an example. Also, the memory controller 610 may generate an entry index according to the operations according to the above-described embodiments, and may also map a new physical address PPN to the logical address LPN.

The DRAM controller 612 may provide commands/addresses CMD/ADD for storing and reading information, and the information provided from the DRAM controller 612 may be stored in the DRAM cells 621 of the DRAM 620. In an example embodiment, an L2P mapping table may be stored in the DRAM 620, an entry index may be stored in some of a plurality of storage spaces of the L2P mapping table according to the above-described embodiments, and also, the physical address PPN may be stored in another part of the storage space. Also, when the information writing operation is completed, the DRAM 620 may provide a completion response ACK to the DRAM controller 612.

FIG. 13B shows a timing diagram related to a DRAM access operation. For example, the DRAM controller 612 may provide a command CMD_R and an address ADD for storing the entry index in the DRAM 620 in response to write data being stored in the write buffer. The address ADD may correspond to a logical address LPN indicating a storage space of the L2P mapping table.

As shown in FIG. 13B, at least two DRAM access operations may be performed on the DRAM 620 in response to a data write request from the host. For example, a DRAM access operation for storing an entry index in the L2P mapping table and a DRAM access operation for updating a physical address PPN in the L2P mapping table may be performed.

Figure 14A:
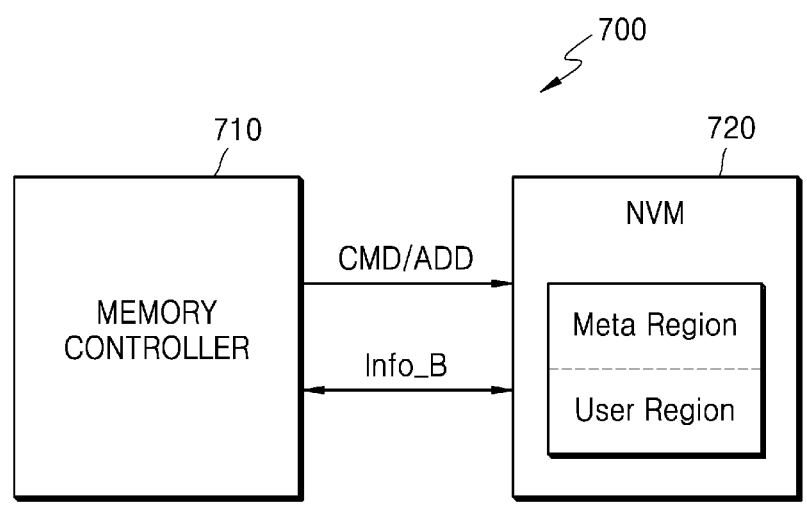
FIGS. 14A and 14B are diagrams illustrating a case in which an old physical address Old PPN is included in entry information.
Figure 14B:
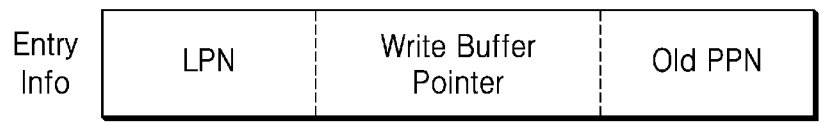

FIGS. 14A and 14B illustrate a case in which an old physical address Old PPN is included in entry information. The memory system 700 may include a memory controller 710 and a nonvolatile memory device (or NVM) 720, and the nonvolatile memory device 720 may include a meta region and a user region.

The memory controller 710 may back up various pieces of information in the meta region of the nonvolatile memory device 720 to prepare for a sudden power-off situation. The memory controller 710 may provide a command/address CMD/ADD for a backup operation to the nonvolatile memory device 720, and the backup information Info B may include various types of information. For example, as the aforementioned various information, at least some of write data, entry information, and mapping information may be stored in the meta region as backup information Info B.

In an example embodiment, the backup information Info B may be stored in the nonvolatile memory device 720 at an arbitrary timing before sudden power-off occurs. Alternatively, the backup information Info B may be stored in the nonvolatile memory device 720 using predetermined power (e.g., auxiliary power included in the memory system) after sudden power-off occurs.

Meanwhile, referring to FIG. 14B, entry information may include a logical address LPN, a write buffer pointer, and an old physical address Old PPN. If an abnormal situation such as sudden power off occurs while the write data program operation is not completed, the memory controller 710 may perform an additional operation using the backup information Info B read from the nonvolatile memory device 720.

As an example, as an entry index is read from mapping information, entry information may be read at a location of an entry buffer indicated by the entry index, and a logical address LPN, a write buffer pointer, and an old physical address Old PPN may be identified through the entry information. If write data exists in the location of the write buffer identified through the write buffer pointer, an operation of programming the write data into the nonvolatile memory device 720 may be performed. Alternatively, when the write data exists in the memory system 700 as the write data stored in the write buffer are backed up to the nonvolatile memory device 720 together, the above program operation may be performed using write data backed up in the nonvolatile memory device 720. In an example embodiment, the write data backed up in the nonvolatile memory device 720 may be stored again in the write buffer using the write buffer pointer, and a program operation may be performed using the write data stored again in the write buffer.

Meanwhile, in various cases, such as when write data does not exist at the location indicated by the write buffer pointer or when write data is not backed up, a situation in which the write data cannot be programmed into the nonvolatile memory device 720 may occur. In an example embodiment, the memory controller 710 may store the old physical address Old PPN as information mapped to the logical address LPN in a mapping table, and provide information indicating that the write data has not been written to the nonvolatile memory device 720 to the host.

Figure 15:
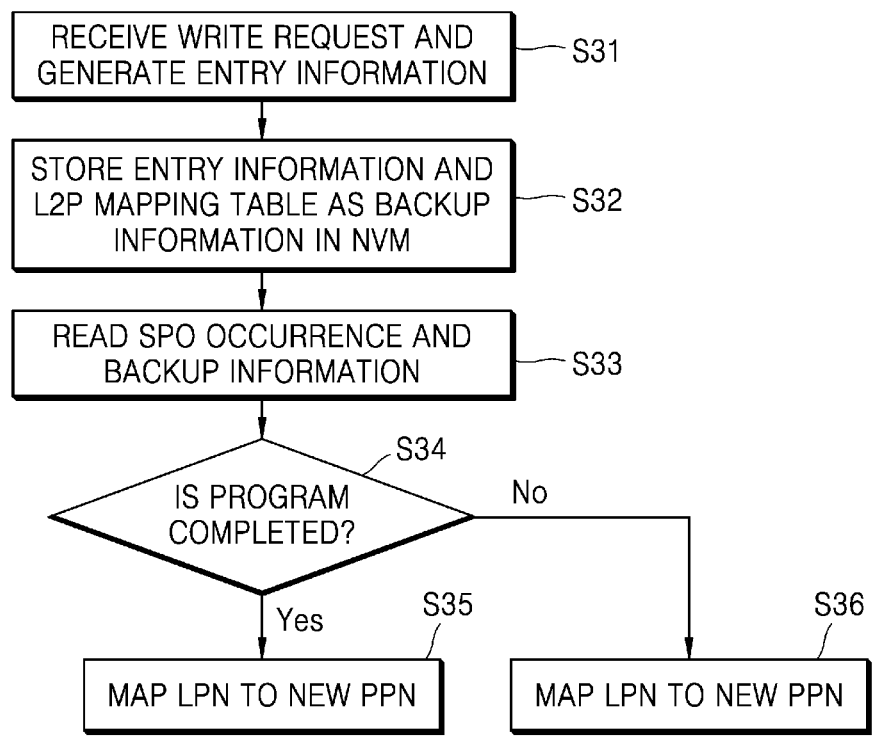
FIG. 15 is a flowchart illustrating an example of an operation of the memory system shown in FIG. 14.

FIG. 15 is a flowchart illustrating an example of an operation of the memory system shown in FIG. 14.

Referring to FIG. 15, the memory controller may receive a write request from the host and also generate entry information in S31. In addition, the memory controller may store or back up backup information including entry information and an L2P mapping table in a non-volatile memory in S32, and the memory controller may read backup information from the nonvolatile memory when sudden power off (SPO) occurs in S33.

Information stored in a plurality of storage spaces of the L2P mapping table may be checked through the backup information, and information stored in correspondence to any one logical address LPN may be an entry index or a physical address PPN. Through the confirmation of the information, it is possible to determine whether the program of the write data corresponding to the logical address LPN has been completed in S34, and when the program is completed, information mapped to the logical address LPN may correspond to a newly mapped physical address New PPN. On the other hand, if the program is judged to be incomplete, reprogramming write data through backup information may be tried, and if reprogramming is not possible, an operation of storing or updating a physical address Old PPN previously mapped in a storage space corresponding to the logical address LPN may be performed. In addition, in this case, since the storage of the write data in the nonvolatile memory device has failed, information indicating this may be provided to the host.

Figure 16:
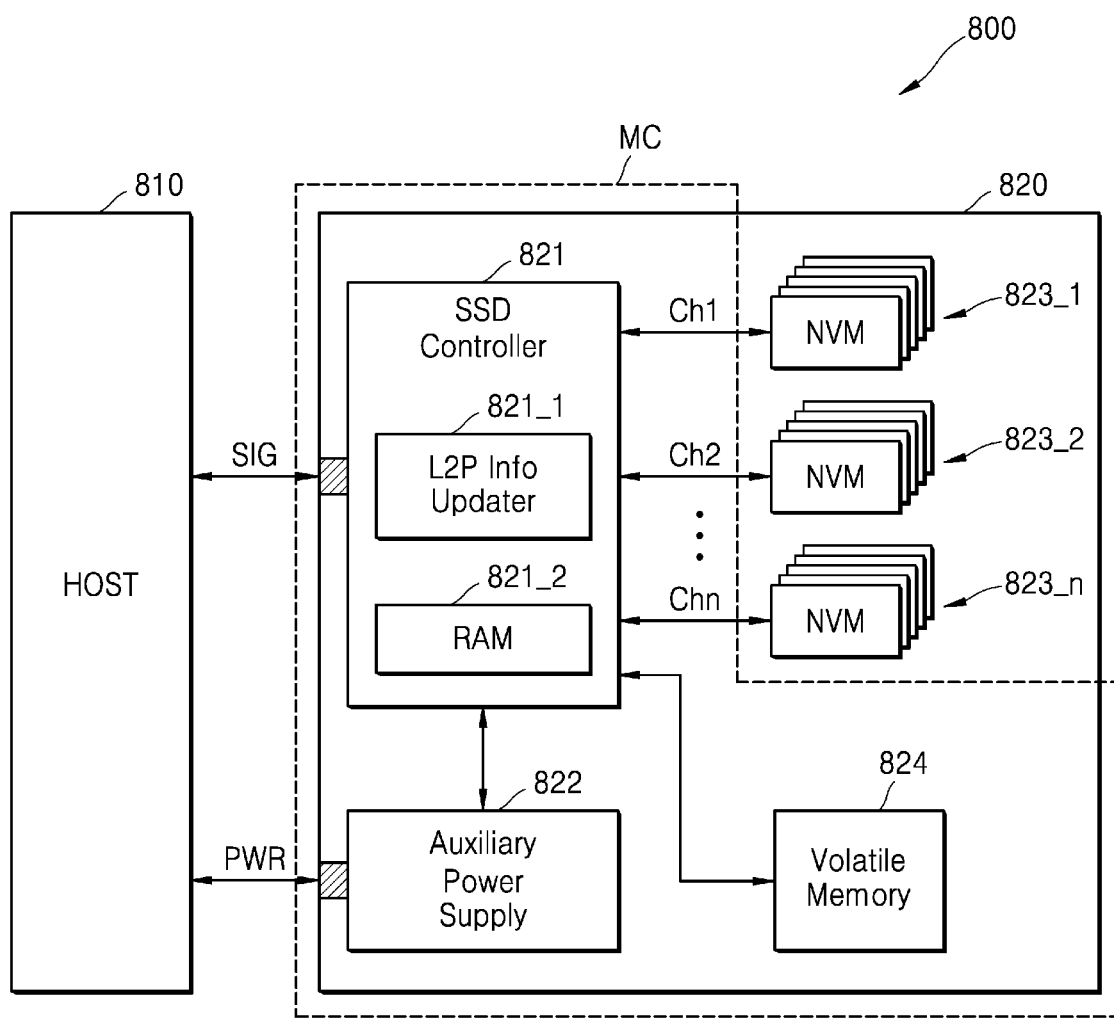
FIG. 16 is a block diagram illustrating an example of applying a memory system according to embodiments to an SSD system.

FIG. 16 is a block diagram illustrating an example of applying a memory system according to embodiments to an SSD system.

Referring to FIG. 16, an SSD system 800 may include a host 810 and an SSD 820. The SSD 820 may exchange signals SIG with and from the host 810 through a signal connector, and receive power PWR through a power connector. The SSD 820 may include an SSD controller 821, an auxiliary power supply 822, nonvolatile memory devices 823_1 to 823_*n*, and a volatile memory 824. The nonvolatile memory devices 823_1 to 823_*n* may include NAND flash memories and the like. At this time, the SSD 820 may be implemented using the embodiments described above with reference to FIGS. 1 to 15.

For example, the SSD controller 821 provided in the SSD 820 may include the L2P updater 821_1 and the RAM 821_2 according to the above-described embodiments, and when a write request is received from the host 810, the L2P updater 821_1 may control a storage operation for an entry index and an update operation of a physical address PPN. In addition, various programs and data related to control of memory operations may be stored in the RAM 821_2 in the SSD controller 821, and for example, when the nonvolatile memory devices 823_1 to 823_n include NAND flash memories, a flash translation layer FTL may be stored in the RAM 821_2.

Also, according to an example embodiment, a write buffer, an entry buffer, and a circuit for storing L2P mapping information may be implemented in the SSD 820. As an example, the write buffer, the entry buffer, and the L2P mapping information storage circuit may be implemented in RAM 621_2, and alternatively, at least some of the write buffer, entry buffer, and L2P mapping information storage circuit may be implemented in the volatile memory 624.

Also, a memory controller MC according to embodiments may be defined as including various elements. For example, the memory controller MC may be defined as including the SSD controller 621, or the memory controller MC may be defined as further including at least one of an auxiliary power supply 622 and a volatile memory 624.

Various changes in form and details may be made therein without departing from the spirit and scope of the following claims.

What is claimed is:

1. A method of operating a memory controller for controlling a memory device, the method comprising:
receiving a write request and write data from a host;
storing first entry information in an entry buffer, wherein the first entry information comprises a write buffer pointer indicating a first location where the write data is temporarily stored in a write buffer and the first entry information comprises a first logical address corresponding to the write request;
storing an entry index in a first storage space corresponding to the first logical address in a logical-to-physical (L2P) mapping information storage circuit, wherein the entry index indicates a second location where the first entry information is stored in the entry buffer;
programming the write data into the memory device at a first physical address; and
updating the entry index stored in the first storage space to correspond to the first physical address, wherein the first physical address is mapped to the first logical address.

2. The method of claim 1, wherein the first entry information further comprises an old physical address previously mapped to the first logical address.

3. The method of claim 1, wherein the L2P mapping information storage circuit comprises dynamic random access memory (DRAM) disposed inside or outside the memory controller.

4. The method of claim 1, wherein the entry index comprises information indicating a second location where the first entry information is stored in the entry buffer.

5. The method of claim 1, wherein the storing of the first entry information in the first storage space is performed in response to providing a request response corresponding to the write request to the host.

6. The method of claim 1, wherein the updating of the entry index to the first physical address is performed in response to transmitting a program command for programming the write data into the memory device to the memory device.

7. The method of claim 1, wherein the L2P mapping information storage circuit comprises storage spaces corresponding to a plurality of logical addresses,
wherein an entry index is stored in a storage space corresponding to logical addresses related to data temporarily stored in the write buffer among the plurality of logical addresses,
wherein physical addresses mapped to the logical addresses are stored in a storage space corresponding to logical addresses related to data programmed in the memory device.

8. The method of claim 7, wherein flag information for determining the entry index and the first physical address is further stored in each storage space of the L2P mapping information storage circuit.

9. The method of claim 1, further comprising:
receiving a read request and the first logical address from the host;
reading the entry index stored in the first storage space of the L2P mapping information storage circuit;
reading the first entry information from a position indicated by the entry index in the entry buffer; and
outputting the write data read from the write buffer to the host by referring to the first entry information.

10. The method of claim 1, further comprising:
non-volatilely storing one or more pieces of entry information stored in the entry buffer and mapping information stored in the L2P mapping information storage circuit in the memory device;
rebooting, after a sudden power-off, the memory controller; and
programming at least one piece of data stored in the write buffer into the memory device based on the entry information read from the memory device and the mapping information.

11. A memory controller for controlling a memory device, the memory controller comprising:
a host interface configured to:
communicate with a host, and
receive a write request, write data, and a first logical address wherein the first logical address corresponds to the write data;
a processor configured to control a program operation of the memory device in response to the write request;
a write buffer configured to temporarily store the write data;
an entry buffer configured to store first entry information, the first entry information comprising a write buffer pointer, the write buffer pointer indicating a first location where the write data is stored in the write buffer; and
a logical-to-physical (L2P) mapping information storage circuit comprising a plurality of storage spaces, wherein the L2P mapping information storage circuit is configured to store, in a first storage space, an entry index indicating a second location where the first entry information is stored in the entry buffer, wherein the first storage space corresponds to the first logical address,
wherein the processor is further configured to:
program the write data into the memory device at a first physical address, and
update the entry index stored in the first storage space to correspond to the first physical address, wherein the first physical address is mapped to the first logical address.

12. The memory controller of claim 11, further comprising a memory for storing a flash translation layer (FTL) for managing mapping information between logical addresses and physical addresses,
wherein the processor is further configured to control storage of the entry index and updates of the first physical address by executing programs included in the FTL.

13. The memory controller of claim 11, further comprising:
   an entry index updater configured to store the entry index in the first storage space in response to the write data being stored in the write buffer; and
   a physical address updater configured to update information stored in the first storage space to the first physical address in response to the write data being programmed into the memory device.

14. The memory controller of claim 11, wherein the L2P mapping information storage circuit comprises dynamic random access memory (DRAM),
   wherein the memory controller further comprises a DRAM controller to perform at least two DRAM access operations for storing the entry index and updating the first physical address in response to one write request from the host.

15. The memory controller of claim 11, wherein the processor is further configured to, when the read request and the first logical address are received from the host:
   read the entry index from the first storage space, and
   output the write data read from the write buffer to the host based on the first entry information stored in the entry buffer.

16. The memory controller of claim 11, wherein the first entry information further comprises the first logical address and an old physical address previously mapped to the first logical address.

17. The memory controller of claim 11, wherein the processor is further configured to:
   control a memory operation such that entry information stored in the entry buffer and mapping information stored in the L2P mapping information storage circuit are non-volatilely stored in the memory device, and
   perform a control operation to read the entry information and the mapping information from the memory device after sudden power-off.

18. A memory system configured to communicate with a host, the memory system comprising:
   a memory controller configured to:
      receive a write request and write data from the host, and control a memory operation in response to the write request;
   a volatile memory configured to store mapping information between a logical address from the host and a physical address, the physical address indicating a physical storage location of the write data; and
   a nonvolatile memory device including a plurality of cell blocks, each cell block including a plurality of nonvolatile memory cells,
   wherein the memory controller is configured to:
      store, in the volatile memory, first information identifying a location of the write data temporarily stored in the memory system before the write data is programmed into the nonvolatile memory device, wherein the first information comprises an entry index indicating a second location where entry information is stored in an entry buffer, and
      update, in the volatile memory, the physical address mapped to the logical address when the write data is programmed into the nonvolatile memory device.

19. The memory system of claim 18, wherein the memory controller comprises a write buffer temporarily storing the write data, and an entry buffer, the entry buffer storing the entry information including a write buffer pointer indicating a first location where the write data is stored in the write buffer.

20. The memory system of claim 18, wherein the volatile memory is dynamic random access memory (DRAM) disposed outside the memory controller,
   wherein the memory controller is configured to:
      perform a first DRAM access operation for storing the first information in the DRAM in response to receiving the write request, and
      perform a second DRAM access operation for updating the physical address to the DRAM in response to programming of the write data into the nonvolatile memory device.

* * * * *